(12) United States Patent
Saeki et al.

(10) Patent No.: US 10,567,673 B2
(45) Date of Patent: Feb. 18, 2020

(54) ON-VEHICLE DISPLAY CONTROL DEVICE, ON-VEHICLE DISPLAY SYSTEM, ON-VEHICLE DISPLAY CONTROL METHOD, AND NON-TRANSITORY STORAGE MEDIUM

(71) Applicant: JVC KENWOOD Corporation, Yokohama-shi, Kanagawa (JP)

(72) Inventors: Izumi Saeki, Yokohama (JP); Noboru Katsumata, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/565,665

(22) Filed: Sep. 10, 2019

(65) Prior Publication Data

US 2020/0007793 A1 Jan. 2, 2020

Related U.S. Application Data

(60) Division of application No. 15/967,709, filed on May 1, 2018, which is a continuation of application No. PCT/JP2016/089116, filed on Dec. 28, 2016.

(30) Foreign Application Priority Data

Mar. 9, 2016 (JP) ................. 2016-046009
Mar. 10, 2016 (JP) ................. 2016-047185
Mar. 15, 2016 (JP) ................. 2016-051385

(51) Int. Cl.
*H04N 5/262* (2006.01)
*G06K 9/00* (2006.01)
*G06T 7/70* (2017.01)
*G06T 7/20* (2017.01)
(Continued)

(52) U.S. Cl.
CPC ............ *H04N 5/2628* (2013.01); *B60R 1/00* (2013.01); *G06K 9/00805* (2013.01); *G06T 7/20* (2013.01);
(Continued)

(58) Field of Classification Search
CPC ............... B60R 1/00; B60R 2300/105; B60R 2300/303; B60R 2300/802;
(Continued)

(56) References Cited

U.S. PATENT DOCUMENTS 9,981,598 B2 * 5/2018 Watanabe ............... B60Q 1/50
2006/0069478 A1 3/2006 Iwama
(Continued)

FOREIGN PATENT DOCUMENTS

JP 2015-009646 1/2015

OTHER PUBLICATIONS

U.S. Appl. No. 15/967,709, filed May 1, 2018.
(Continued)

*Primary Examiner* — Huy T Nguyen
(74) *Attorney, Agent, or Firm* — Amin, Turocy & Watson, LLP

(57) ABSTRACT

An on-vehicle display control device includes a rear video data acquiring unit configured to acquire first video data from a rear camera on a rear part of a vehicle to image a rear view; a rear side video data acquiring unit configured to acquire second video data from rear side cameras on right and left parts of the vehicle to image rear side views, a clipping unit configured to clip a first area that is a part of the first video data and second areas located on right and left sides of the first area, and a display controller configured to display video data clipped as the first area on a rearview monitor to display rear video, display the second video data on side monitors to display rear side video, and display video data clipped as the second area on the side monitors under a predetermined condition.

11 Claims, 16 Drawing Sheets

(51) Int. Cl.
  *B60R 1/00* (2006.01)
  *H04N 5/232* (2006.01)
(52) U.S. Cl.
  CPC .......... *G06T 7/70* (2017.01); *B60R 2300/105* (2013.01); *B60R 2300/303* (2013.01); *B60R 2300/802* (2013.01); *B60R 2300/8046* (2013.01); *G06T 2207/10016* (2013.01); *G06T 2207/30261* (2013.01); *H04N 5/23293* (2013.01)
(58) Field of Classification Search
  CPC ..... B60R 2300/8046; G06T 7/70; G06T 7/20; G06T 2207/10016; G06T 2207/30261; G06K 9/00805; H04N 5/2628; H04N 5/2329
  See application file for complete search history.

(56) References Cited

U.S. PATENT DOCUMENTS

2010/0013930 A1   1/2010   Matsuo et al.
2014/0055616 A1   2/2014   Corcoran et al.

OTHER PUBLICATIONS

U.S. Appl. No. 16/565,654, filed Sep. 10, 2019.
International Search Report and Written Opinion for International Patent Application No. PCT/JP2016/089116 dated Mar. 28, 2017, 10 pages.
Non-Final Office Action for U.S. Appl. No. 15/967,709 dated Jul. 10, 2019.

* cited by examiner

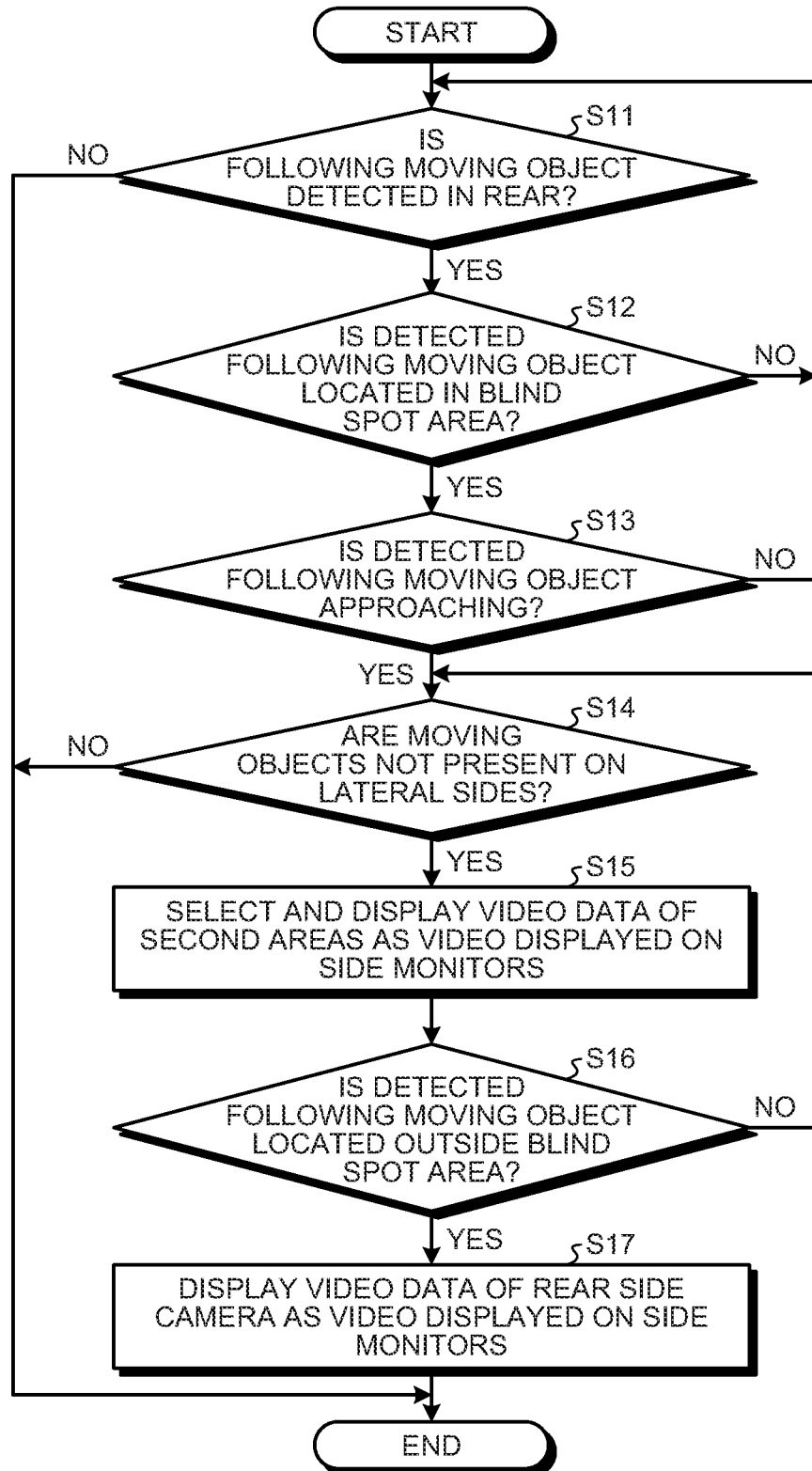

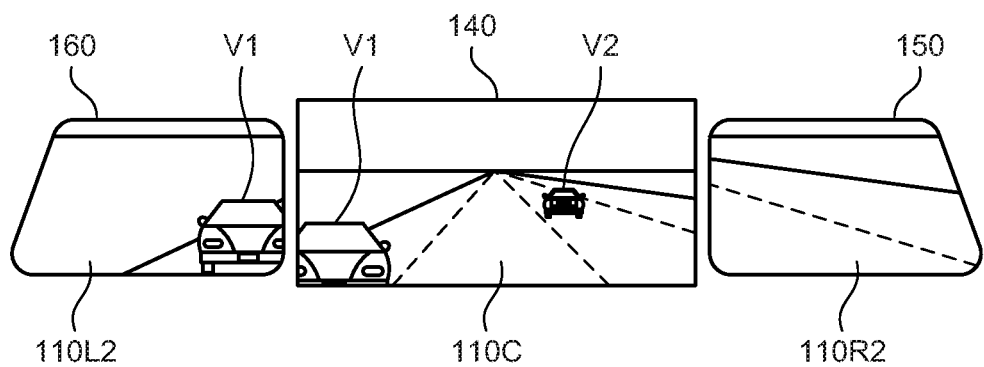
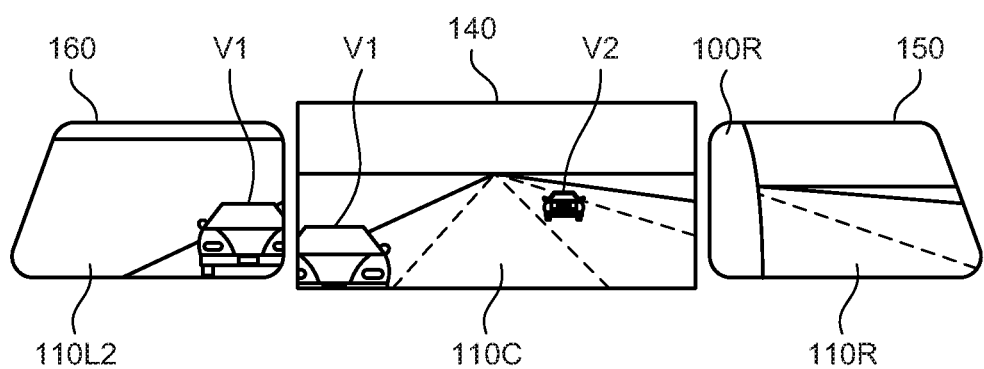

ON-VEHICLE DISPLAY CONTROL DEVICE, ON-VEHICLE DISPLAY SYSTEM, ON-VEHICLE DISPLAY CONTROL METHOD, AND NON-TRANSITORY STORAGE MEDIUM

CROSS-REFERENCE TO RELATED APPLICATIONS

This application is a Divisional of application Ser. No. 15/967,709 filed on May 1, 2018 which is a Continuation of International Application No. PCT/JP2016/089116, filed on Dec. 28, 2016 which claims the benefit of priority of the prior Japanese Patent Application No. 2016-046009, filed on Mar. 9, 2016, Japanese Patent Application No. 2016-047185, filed on Mar. 10, 2016 and Japanese Patent Application No. 2016-051385, filed on Mar. 15, 2016, the entire contents of all of which are incorporated herein by reference.

FIELD

The present application relates to an on-vehicle display control device, an on-vehicle display system, an on-vehicle display control method, and a non-transitory storage medium.

BACKGROUND

There is a known technology for displaying video provided by a rear camera that images a rear surrounding area of a vehicle and displaying video provided by side cameras that image side surrounding areas of the vehicle, instead of a rearview mirror for checking a rear side of the vehicle, a left side mirror, and a right side mirror (for example, see Japanese Laid-open Patent Publication No. 2015-009646).

Incidentally, a blind spot exists in a side mirror of a vehicle due to a reflection of the vehicle in the mirror. Even in a case where the side camera are used instead of the right and left side mirrors, blind spots exist in the same way. Therefore, it is difficult for a driver to check following moving objects including following vehicles located in the blind spots. Thus, there is a demand for a technology capable of appropriately checking surroundings of a vehicle.

SUMMARY

An on-vehicle display control device, an on-vehicle display system, an on-vehicle display control method, and a non-transitory storage medium are disclosed.

According to one aspect of the present application, there is provided an on-vehicle display control device comprising: a rear video data acquiring unit configured to acquire first video data from a rear camera that is arranged on a rear part of a vehicle and configured to image a rear view of the vehicle; a rear side video data acquiring unit configured to acquire second video data from rear side cameras that are arranged on right and left parts of the vehicle and configured to image rear side views of the vehicle; a clipping unit configured to clip a first area that is a part of the first video data acquired by the rear video data acquiring unit and second areas located on right and left sides of the first area; and a display controller configured to display video data clipped as the first area on a rearview monitor that is configured to display rear video of the vehicle, display the second video data on side monitors that are configured to display rear side video of the vehicle, and display video data clipped as the second area on the side monitors under a predetermined condition.

According to one aspect of the present application, there is provided an on-vehicle display control method comprising: acquiring rear video data as first video data from a rear camera that is arranged on a rear part of a vehicle and configured to image a rear view of the vehicle; acquiring rear side video data as second video data from rear side cameras that are arranged on right and left parts of the vehicle and configured to image rear side views of the vehicle; clipping a first area that is a part of the first video data acquired at the acquiring and second areas located on right and left sides of the first area; displaying video data clipped as the first area on a rearview monitor that is configured to display rear video of the vehicle; displaying the second video data on side monitors that are configured to display rear side video of the vehicle; and displaying video data clipped as the second area on the side monitors under a predetermined condition.

According to one aspect of the present application, there is provided a non-transitory storage medium that stores a program for causing a computer to execute: acquiring rear video data as first video data from a rear camera that is arranged on a rear part of a vehicle and configured to image a rear view of the vehicle; acquiring rear side video data as second video data from rear side cameras that are arranged on right and left parts of the vehicle and configured to image rear side views of the vehicle; clipping a first area that is a part of the first video data acquired at the acquiring and second areas located on right and left sides of the first area; displaying video data clipped as the first area on a rearview monitor that is configured to display rear video of the vehicle; displaying the second video data on side monitors that are configured to display rear side video of the vehicle; and displaying video data clipped as the second area on the side monitors under a predetermined condition.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 6 is a flowchart illustrating flow of a process performed by a display controller of an on-vehicle display control device of the on-vehicle display system according to the first embodiment;

FIG. 7 is a diagram illustrating another example of video displayed on the rearview monitor, the right side monitor, and the left side monitor of the on-vehicle display system according to the first embodiment;

FIG. 8 is a diagram illustrating still another example of video displayed on the rearview monitor, the right side monitor, and the left side monitor of the on-vehicle display system according to the first embodiment;

DETAILED DESCRIPTION OF THE PREFERRED EMBODIMENTS

Embodiments of an on-vehicle display control device 10, an on-vehicle display system 1, an on-vehicle display control method, and a non-transitory storage medium according to the present application will be described in detail below with reference to the accompanying drawings. The present application is not limited by the embodiments below.

First Embodiment

Figure 1:
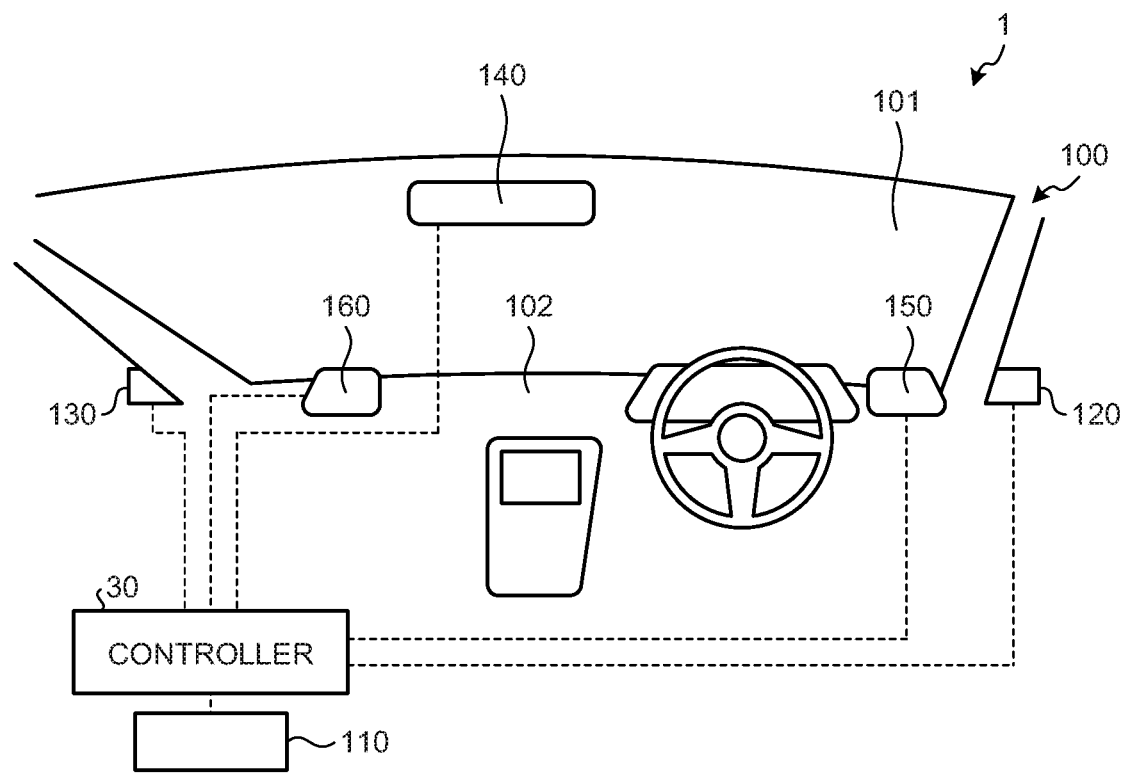
FIG. 1 is a schematic diagram illustrating a configuration example of an on-vehicle display system according to a first embodiment.
Figure 2:
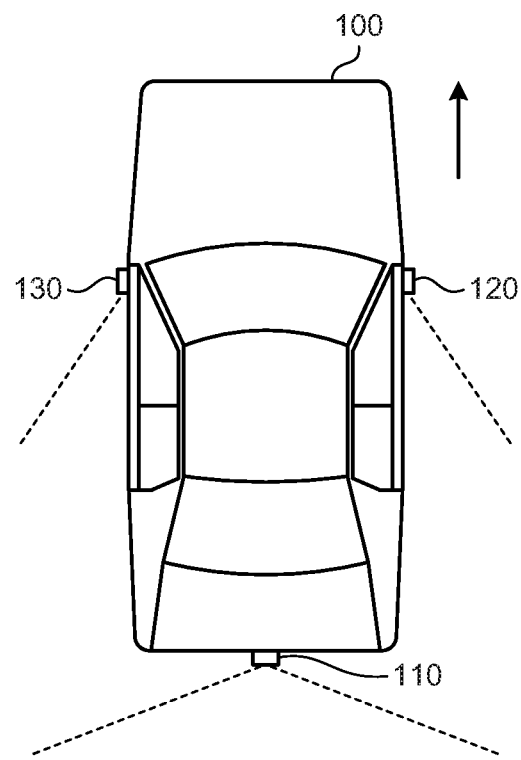
FIG. 2 is a schematic diagram illustrating a configuration example of the on-vehicle display system according to the first embodiment.
Figure 3:
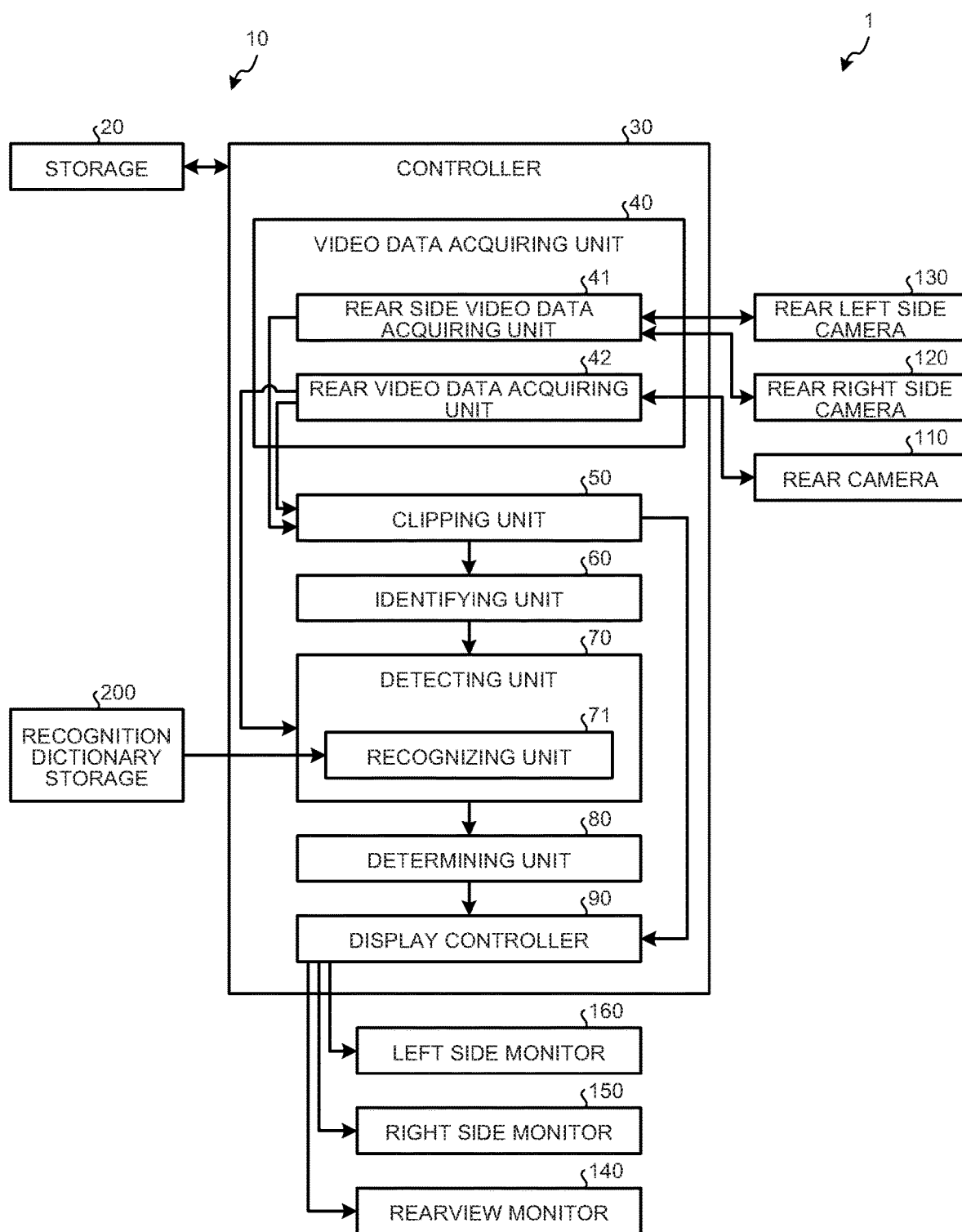
FIG. 3 is a block diagram illustrating a configuration example of the on-vehicle display system according to the first embodiment.

The on-vehicle display system 1 is mounted on a vehicle 100 and displays surroundings of the vehicle. FIG. 1 is a schematic diagram illustrating a configuration example of the on-vehicle display system according to a first embodiment. FIG. 2 is a schematic diagram illustrating a configuration example of the on-vehicle display system according to the first embodiment. FIG. 3 is a block diagram illustrating a configuration example of the on-vehicle display system according to the first embodiment.

As illustrated in FIG. 1 to FIG. 3, the on-vehicle display system 1 includes a rear camera 110, a rear right side camera (rear side camera) 120, a rear left side camera (rear side camera) 130, a rearview monitor 140, a right side monitor 150, a left side monitor 160, a recognition dictionary storage 200, and the on-vehicle display control device 10.

Figure 4:
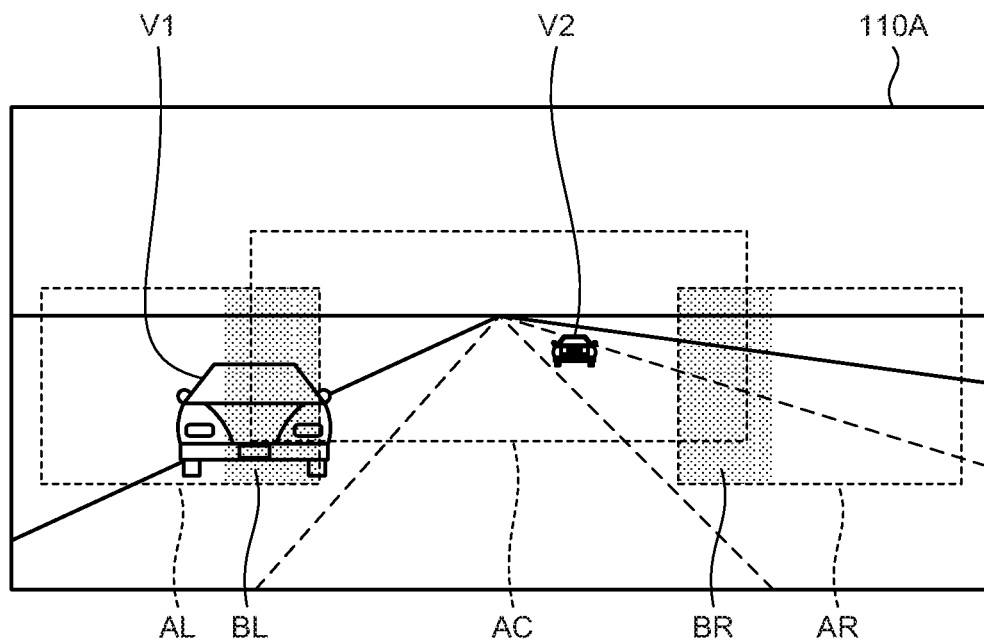
FIG. 4 is a diagram illustrating an example of video data captured by a rear camera of the on-vehicle display system according to the first embodiment.

The rear camera 110 is arranged on a rear part of the vehicle 100 and images rear view of the vehicle 100. The rear camera 110 images an area including an area checked by the rearview monitor 140. The rear camera 110 images an area including blind spots of the rear right side camera 120 and the rear left side camera 130. A horizontal angle of view of the rear camera 110 is, for example, 90° to 180°, and a vertical angle of view of the rear camera 110 is, for example, 45° to 90°. Specifically, the rear camera 110 captures first video data 110A as illustrated in FIG. 4. FIG. 4 is a diagram illustrating an example of video data captured by the rear camera of the on-vehicle display system according to the first embodiment. The rear camera 110 is capable of capturing video in a wider area than the area displayed on the rearview monitor 140; however, the rear camera 110 clips a first area AC as an area that allows a driver of the vehicle 100 to appropriately recognize the rear side using the rearview monitor 140, and displays the first area AC on the rearview monitor 140. The first video data 110A includes the first area AC that is an area checked by the rearview monitor 140, and the second areas AR and AL that are areas checked by the right side monitor 150 and the left side monitor 160. The first area AC and the second area AR partially overlap with each other. The first area AC and the second area AL partially overlap with each other. The first video data 110A includes, on the lateral sides of the first area AC, a blind spot area BR corresponding to a blind spot of the rear right side camera 120 and a blind spot area BL corresponding to a blind spot of the rear left side camera 130. In the present embodiment, the first video data 110A further includes areas outside the first area AC, the second area AR, and the second area AL. In other words, the rear camera 110 normally captures an image including areas that are not displayed on the rearview monitor 140, the right side monitor 150, and the left side monitor 160. The rear camera 110 outputs the captured first video data 110A to a rear video data acquiring unit 42 of a video data acquiring unit 40 of the on-vehicle display control device 10.

The rear right side camera 120 is arranged on a right part of the vehicle 100 and images a rear right side view of the vehicle 100. The rear right side camera 120 images an area checked by the right side monitor 150. A horizontal angle of view of the rear right side camera 120 is, for example, 15° to 45°, and a vertical angle of view of the rear right side camera 120 is, for example, 15° to 45°. The angle of the rear right side camera 120 is freely adjustable. The rear right side camera 120 outputs the captured video to a rear side video data acquiring unit 41 of the video data acquiring unit 40 of the on-vehicle display control device 10.

The rear left side camera 130 is arranged on a left part of the vehicle 100 and images a rear left side view of the vehicle 100. The rear left side camera 130 images an area checked by the left side monitor 160. A horizontal angle of view of the rear left side camera 130 is, for example, 15° to 45°, and a vertical angle of view of the rear left side camera 130 is, for example, 15° to 45°. The angle of the rear left side camera 130 is freely adjustable. The rear left side camera 130 outputs the captured video to the rear side video data acquiring unit 41 of the video data acquiring unit 40 of the on-vehicle display control device 10.

Figure 5:
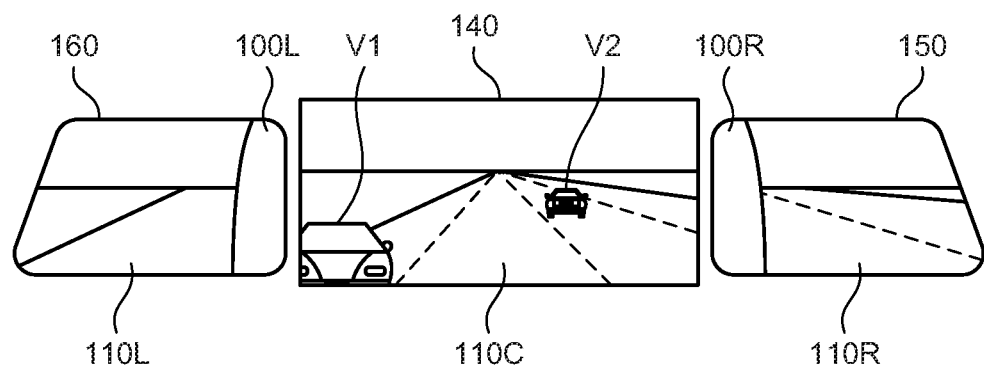
FIG. 5 is a diagram illustrating an example of video displayed on a rearview monitor, a right side monitor, and a left side monitor of the on-vehicle display system according to the first embodiment.

As one example, the rearview monitor 140 is an electronic rearview mirror. When the rearview monitor 140 is used as an electronic rearview mirror, it does not matter whether a half mirror for checking the rear side using optical reflection is provided or not. The rearview monitor 140 is, for example, a display including a liquid crystal display (LCD), an organic electro-luminescence (EL) display, or the like. The rearview monitor 140 displays video of the rear side of the vehicle 100 based on a video signal output from a display controller 90 of the on-vehicle display control device 10. Specifically, the rearview monitor 140 displays rear video as illustrated in FIG. 5. FIG. 5 is a diagram illustrating an example of video displayed on the rearview monitor, the right side monitor, and the left side monitor of the on-vehicle display system according to the first embodiment. The video displayed in the rearview monitor 140 partially overlaps with the video displayed in the right side monitor 150 and the video displayed the left side monitor 160 on the lateral sides thereof. The rearview monitor 140 is arranged in a certain position so as to be easily viewed by the driver. In the present embodiment, the rearview monitor 140 is arranged in an upper central part of a windshield 101 in a vehicle-width direction.

The right side monitor 150 is, for example, a display including a liquid crystal display, an organic EL display, or the like. The right side monitor 150 displays video of the right rear side of the vehicle 100 based on a video signal output from the display controller 90 of the on-vehicle display control device 10. Specifically, the right side monitor 150 displays right rear video as illustrated in FIG. 5. The right side monitor 150 has an area in which a right side body 100R of the vehicle 100 appears and rear visibility is limited. The right side monitor 150 is arranged in a certain position so as to be easily viewed by the driver. In the present embodiment, the right side monitor 150 is arranged on the right side of a dashboard 102 in the vehicle-width direction.

The left side monitor 160 is, for example, a display including a liquid crystal display, an organic EL display, or the like. The left side monitor 160 displays video of the left rear side of the vehicle 100 based on a video signal output from the display controller 90 of the on-vehicle display control device 10. Specifically, the left side monitor 160 displays left rear video as illustrated in FIG. 5. The left side monitor 160 includes an area in which a left side body 100L of the vehicle 100 appears and rear visibility is limited. The left side monitor 160 is arranged in a certain position so as to be easily viewed by the driver. More specifically, the left side monitor 160 is arranged on the left side of the dashboard 102 in the vehicle-width direction.

The recognition dictionary storage 200 stores therein, for example, a recognition dictionary that enables matching of patterns, such as shapes in a front view, sizes, and colors of moving objects including four-wheel vehicles, two-wheel vehicles, and persons. The recognition dictionary storage 200 is, for example, a semiconductor memory device, such as a random access memory (RAM), a read only memory (ROM), or a flash memory, or a storage device, such as a hard disk, an optical disk, or an external storage device over a network.

Referring back to FIG. 3, the on-vehicle display control device 10 includes a storage 20 and a controller 30.

The storage 20 stores therein data needed for various processes performed in the on-vehicle display control device 10, and also stores therein results of the various processes. The storage 20 is, for example, a semiconductor memory device, such as a RAM, a ROM, or a flash memory, or a storage device, such as a hard disk, an optical disk, or an external storage device over a network.

The controller 30 is, for example, an arithmetic processing device configured by a central processing unit (CPU) or the like. The controller 30 includes the video data acquiring unit 40, a clipping unit 50, an identifying unit 60, a detecting unit 70, a determining unit 80, and the display controller 90. The controller 30 executes commands included in programs stored in the storage 20.

The video data acquiring unit 40 acquires video obtained by imaging the rear and the rear sides of the vehicle 100. The video data acquired by the video data acquiring unit 40 is, for example, video data including consecutive images at 120 frames per second. The video data acquiring unit 40 includes the rear side video data acquiring unit 41 and the rear video data acquiring unit 42. The rear side video data acquiring unit 41 acquires second video data output by the rear right side camera 120 and the rear left side camera 130. The rear side video data acquiring unit 41 outputs the acquired second video data to the clipping unit 50. The rear video data acquiring unit 42 acquires the first video data 110A output by the rear camera 110. The rear video data acquiring unit 42 outputs the acquired first video data 110A to the clipping unit 50 and the detecting unit 70.

The clipping unit 50 clips the first area AC, which is a part of the first video data 110A, from the first video data 110A. A target area to be adopted as the first area AC in the first video data 110A is registered and stored in advance. In the present embodiment, a central portion of the first video data 110A is adopted as the first area AC. The clipping unit 50 outputs clipped rear video data 110C to the identifying unit 60 and the display controller 90.

The clipping unit 50 clips, from the second video data, first right rear video data 110R and first left rear video data 110L in accordance with the right side monitor 150 and the left side monitor 160. The clipping unit 50 outputs the clipped first right rear video data 110R and the clipped first left rear video data 110L to the display controller 90.

The identifying unit 60 identifies the second area AR, the second area AL, the blind spot area BR, and the blind spot area BL that are located on the lateral sides of the first area AC in the first video data 110A. More specifically, the identifying unit 60 identifies, as the second area AR and the second area AL, areas that are determined in advance to match or substantially match the first right rear video data 110R and the first left rear video data 110L, based on the imaging orientations of the rear right side camera 120 and the rear left side camera 130 or based on the first right rear video data 110R and the first left rear video data 110L as areas that are clipped from the second video data by the clipping unit 50. Further, the identifying unit 60 identifies, as the blind spot area BR and the blind spot area BL, areas that are determined in advance based on the imaging orientations of the rear right side camera 120 and the rear left side camera 130 or based on the first right rear video data 110R and the first left rear video data 110L that are clipped from the second video data by the clipping unit 50. As an alternative identification method, the identifying unit 60 may perform image matching based on the second video data and the first video data 110A, and identify the second area AR, the second area AL, the blind spot area BR, and the blind spot area BL in the first video data 110A as illustrated in FIG. 4. In this case, if the clipping unit 50 has performed a clipping process on the second video data, image matching is performed between the first video data and the first left rear video data 110L, between the first video data and the first right rear video data 110R. The identifying unit 60 outputs, to the detecting unit 70, information on the second area AR, the second area AL, the blind spot area BR, and the blind spot area BL that are identified in the first video data 110A. The process performed by the identifying unit 60 is controlled by the controller 30 so as to be performed when the angle of the rear camera 110, the rear right side camera 120, or the rear left side camera 130 is adjusted or when the rear camera 110, the rear right side camera 120, or the rear left side camera 130 is replaced.

As illustrated in FIG. 4, the identifying unit 60 may display frames representing the second area AR, the second area AL, the blind spot area BR, and the blind spot area BL together with the rear video data 110C on the rearview monitor 140, and specify the second area AR, the second area AL, the blind spot area BR, and the blind spot area BL in the first video data 110A with operation performed by the driver or the like. Specifically, the driver or the like moves the frames to correct positions such that the first right rear video data 110R displayed on the right side monitor 150 and the first left rear video data 110L displayed on the left side monitor 160 match images in the frames displayed on the rearview monitor 140. The identifying unit 60 may identify the second area AR, the second area AL, the blind spot area BR, and the blind spot area BL in the first video data 110A in the manner as described above.

The detecting unit 70 detects one or more following moving objects V from the first video data 110A. The detecting unit 70 may detect the moving object in the whole first video data 110A and determine whether the detected moving object is present in the blind spot area BR or the blind spot area BL, or may detect the moving object in the blind spot area BR or the blind spot area BL. The detecting unit 70 includes a recognizing unit 71 that performs moving object recognition on the first video data 110A, on the blind spot area BR or on the blind spot area BL of the first video data 110A and recognizes the following moving object V. The recognizing unit 71 performs pattern matching on the first video data 110A, on the blind spot area BR or on the blind spot area BL of the first video data 110A using the recognition dictionary stored in the recognition dictionary storage 200, and detects presence of the following moving object V. The recognizing unit 71 recognizes whether a following moving object V1 is located close to or away from the vehicle 100 based on a change in a size of the following moving object V1 in each of the frames of the first video data 110A. The detecting unit 70 outputs a detection result to the display controller 90.

The determining unit 80 determines whether the following moving object V detected by the detecting unit 70 is present in the blind spot area BR or the blind spot area BL. Specifically, in a case of the first video data 110A illustrated in FIG. 4, it is determined that the following moving object V1 is present in the blind spot area BL.

The display controller 90 displays the rear video data 110C on the rearview monitor 140 as a normal display process that is performed ordinary. The display controller 90 displays the first right rear video data 110R on the right side monitor 150 as the normal display process that is performed ordinary. In other words, the display controller 90 ordinary displays the first right rear video data 110R, which is based on the second video data captured by the rear right side camera 120, on the right side monitor 150. The display controller 90 displays the first left rear video data 110L on the left side monitor 160 as the normal display process that is performed ordinary. In other words, the display controller 90 ordinary displays the first left rear video data 110L, which is based on the second video data captured by the rear left side camera 130, on the left side monitor 160.

The display controller 90 determines whether a predetermined condition is satisfied for each frame or for each predetermined frame, and when the predetermined condition is satisfied, the display controller 90 performs a blind spot display process for additionally displaying the blind spot area BR or the blind spot area BL on the right side monitor 150 and the left side monitor 160. More specifically, when the determining unit 80 determines that the following moving object V is present in the blind spot area BR or the blind spot area BL, the display controller 90 displays second right rear video data 110R2 (see FIG. 7) and second left rear video data 110L2 (see FIG. 7), which are clipped from the first video data 110A, on the right side monitor 150 and the left side monitor 160. When the following moving object V moves away from the blind spot area BR or the blind spot area BL of the first video data 110A, the display controller 90 returns the right side monitor 150 and the left side monitor 160 to normal display.

Even when the following moving object V is detected in the blind spot area BR or the blind spot area BL of the first video data 110A, if only a small part of the following moving object V is present in the blind spot area BR or the blind spot area BL (only the small parts appear), the display controller 90 may maintain the normal display on the right side monitor 150 and the left side monitor 160. Specifically, for example, when an area of the following moving object V that has appeared in the blind spot area BR or the blind spot area BL is equal to or smaller than half of an area of the whole following moving object V that may appear in the same area, it may be possible to maintain the normal display.

Next, with reference to FIG. 6, flow of the blind spot display process performed by the display controller 90 will be described. FIG. 6 is a flowchart illustrating the flow of the process performed by the display controller of the on-vehicle display control device of the on-vehicle display system according to the first embodiment.

The display controller 90 determines whether the following moving object V or a part of the following moving object V (hereinafter, described as the following moving object V) is detected on the rear side of the vehicle 100 (Step S11). More specifically, the display controller 90 determines whether the detecting unit 70 has detected the following moving object V in the first video data 110A.

If the display controller 90 determines that the following moving object V is not detected on the rear side of the vehicle 100 (No at Step S11), the process ends.

If the display controller 90 determines that the following moving object V is detected on the rear side of the vehicle 100 (Yes at Step S11), the process proceeds to Step S12.

The display controller 90 determines whether a position of the detected following moving object V is located in the blind spot area BR or the blind spot area BL of the first video data 110A (Step S12). More specifically, the display controller 90 determines whether the detecting unit 70 has detected the following moving object V present in the blind spot area BR or the blind spot area BL of the first video data 110A.

If the display controller 90 determines that the position of the detected following moving object V is not located in the blind spot area BR or the blind spot area BL of the first video data 110A (No at Step S12), the process returns to Step S11 to be repeated.

If the display controller 90 determines that the position of the detected following moving object V is located in the blind spot area BR or the blind spot area BL of the first video data 110A (Yes at Step S12), the process proceeds to Step S13.

The display controller 90 determines whether the detected following moving object V is approaching the vehicle 100 (Step S13). More specifically, for example, the display controller 90 determines whether the detecting unit 70 has detected that the following moving object V is located close to the vehicle 100.

If the display controller 90 determines that the detected following moving object V is not approaching the vehicle 100 (No at Step S13), the process returns to Step S11 to be repeated.

If the display controller 90 determines that the detected following moving object V is approaching the vehicle 100 (Yes at Step S13), the process proceeds to Step S14.

The display controller 90 determines whether the moving object is present on the lateral sides of the vehicle 100 (Step S14). More specifically, the display controller 90 compares portions except for portions in which the body 100R and the body 100L are reflected in the second video data with corresponding portions in the first video data 110A, and if there are differences therebetween, the display controller 90 determines that the moving object is present on the lateral sides of the vehicle 100. In this manner, the display controller 90 detects the moving object that is present on the lateral side of the vehicle 100 and that is imaged by only the rear right side camera 120 or the rear left side camera 130 without being imaged by the rear camera 110.

If the display controller 90 determines that the moving object is not present on the lateral sides of the vehicle 100 (No at Step S14), the process ends.

If the display controller 90 determines that the moving object is present on the lateral sides of the vehicle 100 (Yes at Step S14), the process proceeds to Step S15.

The display controller 90 displays the second right rear video data 110R2 and the second left rear video data 110L2, which are clipped from the first video data 110A, on the right side monitor 150 and the left side monitor 160 (Step S15). More specifically, the display controller 90 causes the clipping unit 50 to clip, as the second right rear video data 110R2 and the second left rear video data 110L2, the second area AR and the second area AL that are located on the lateral sides of the first area AC in the first video data 110A. Then, the display controller 90 displays the clipped second right rear video data 110R2 and the clipped second left rear video data 110L2 on the right side monitor 150 and the left side monitor 160.

The display controller 90 determines whether the position of the following moving object V is located outside the blind spot area BR or the blind spot area BL of the first video data 110A (Step S16). More specifically, the display controller 90 determines whether the detecting unit 70 has detected that the position of the following moving object V is located outside the blind spot area BR or the blind spot area BL of the first video data 110A.

If the display controller 90 determines that the position of the following moving object V is not located outside the blind spot area BR or the blind spot area BL of the first video data 110A (No at Step S16), the process returns to Step S14 to be repeated.

If the display controller 90 determines that the position of the following moving object V is located outside the blind spot area BR or the blind spot area BL of the first video data 110A (Yes at Step S16), the process proceeds to Step S17.

The display controller 90 performs normal display on the right side monitor 150 and the left side monitor 160 (Step S17). More specifically, the display controller 90 displays, on the right side monitor 150 and the left side monitor 160, the first right rear video data 110R and the first left rear video data 110L that are clipped from the second video data.

The display controller 90 may change a determination condition for determining whether the detected following moving object V is present in the blind spot area BR or the blind spot area BL of the first video data 110A, depending on a distance between the vehicle 100 and the following moving object V. For example, when the distance to the detected following moving object V is short, it may be determined that the following moving object V is present when the area of the following moving object V reflected in the blind spot area BR or the blind spot area BL is equal to or greater than 25% of the area of the whole moving object V that may be reflected in the same area. Further, if the distance to the detected following moving object V is long, it may be determined that the following moving object V is present when the area of the following moving object V reflected in the blind spot area BR or the blind spot area BL is equal to or greater than 75% of the area of the whole moving object V that may be reflected in the same area. The distance between the vehicle 100 and the detected following moving object V can be obtained by identifying a ground contact position based on the contour of the detected following moving object when the recognizing unit 71 detects the following moving object V from the first video data 110A, and then using a positional relationship of the ground contact position in the first video data 110A. Specifically, if the distance from the vehicle 100 to the following moving object V is equal to or longer than 100 meters (m), it is determined that the following moving object V is present when the area of the following moving object V reflected in the blind spot area BR or the blind spot area BL is equal to or greater than 75% of the area of the whole moving object V that may be reflected in the same area. Further, if the distance from the vehicle 100 to the following moving object V is equal to or longer than 50 m and shorter than 100 m, it is determined that the following moving object V is present when the area of the following moving object V reflected in the blind spot area BR or the blind spot area BL is equal to or greater than 50% of the area of the whole moving object V that may be reflected in the same area. Furthermore, if the distance from the vehicle 100 to the following moving object V is shorter than 50 m, it is determined that the following moving object V is present when the area of the following moving object V reflected in the blind spot area BR or the blind spot area BL is equal to or greater than 25% of the area of the whole moving object V that may be reflected in the same area.

With reference to FIG. 4, a concrete example of the blind spot display process performed by the display controller 90 will be described. It is assumed that the following moving object V1 is approaching the vehicle 100. At Step S11, the display controller 90 determines that the following moving object V1 and a following moving object V2 are detected in the first video data 110A (Yes at Step S11). Subsequently, the display controller 90 determines that the position of the following moving object V1 is located in the blind spot area BL of the first video data 110A (Yes at Step S12). Then, it is determined that the following moving object V1 is approaching (Yes at Step S13). Subsequently, it is determined that the moving object is not present on the lateral sides of the vehicle 100 (Yes at Step S14). Then, at Step S15, the display controller 90 displays the second left rear video data 110L2 on the left side monitor 160.

Specifically, as illustrated in FIG. 7, the display controller 90 displays the second left rear video data 110L2, in which the following moving object V1 is reflected, on the left side monitor 160, and displays the second right rear video data 110R2 on the right side monitor 150. FIG. 7 is a diagram illustrating another example of video displayed on the rearview monitor, the right side monitor, and the left side monitor of the on-vehicle display system according to the first embodiment.

Alternatively, as illustrated in FIG. 8, the display controller 90 may display the second left rear video data 110L2, in which the following moving object V1 is reflected, on the left side monitor 160, and displays the first right rear video data 110R, which is the normal display, on the right side monitor 150. FIG. 8 is a diagram illustrating another example of video displayed on the rearview monitor, the right side monitor, and the left side monitor of the on-vehicle display system according to the first embodiment.

In this manner, when the display controller 90 detects the following moving object V in the blind spots of the rear right side camera 120 and the rear left side camera 130, the on-vehicle display system 1 displays the second right rear video data 110R2 and the second left rear video data 110L2 on the right side monitor 150 and the left side monitor 160.

As described above, when the following moving object V is present in the blind spots of the rear right side camera 120 and the rear left side camera 130, the on-vehicle display system 1 according to the first embodiment displays the second right rear video data 110R2 and the second left rear video data 110L2, which are clipped from the first video data 110A, on the right side monitor 150 and the left side monitor 160. In this manner, even when the following moving object V is present in the blind spots of the rear right side camera 120 and the rear left side camera 130, the on-vehicle display system 1 can display the following moving object V on the right side monitor 150 and the left side monitor 160. Therefore, the on-vehicle display system 1 can appropriately display the following moving object V. Consequently, the on-vehicle display system 1 allows the driver to check surroundings of the vehicle 100 appropriately.

Second Embodiment

With reference to FIG. 9 to FIG. 13, an on-vehicle display system according to a second embodiment will be described. A basic configuration of the on-vehicle display system according to the second embodiment is the same as that of the on-vehicle display system 1 of the first embodiment. In the following descriptions, the same components as those of the on-vehicle display system 1 will be denoted by the same reference signs or corresponding reference signs, and detailed explanation thereof will be omitted. The on-vehicle display system according to the second embodiment is different from the on-vehicle display system 1 in that a controller performs processes different from the processes performed by the controller 30.

A detecting unit detects a moving direction of the following moving object V. The detecting unit detects the moving direction of the following moving object V based on a change in the position of the following moving object V in each of the frames of the first video data 110A.

A determining unit determines whether the detected following moving object V is moving from the first area AC to the blind spot area BR or the blind spot area BL.

If the determining unit determines that the detected following moving object V is moving from the first area AC, the second area AR, or the second area AL to the blind spot area BR or the blind spot area BL, a display controller displays second right rear video data 110R3 or second left rear video data 110L3 on the right side monitor 150 or the left side monitor 160.

Figure 9:
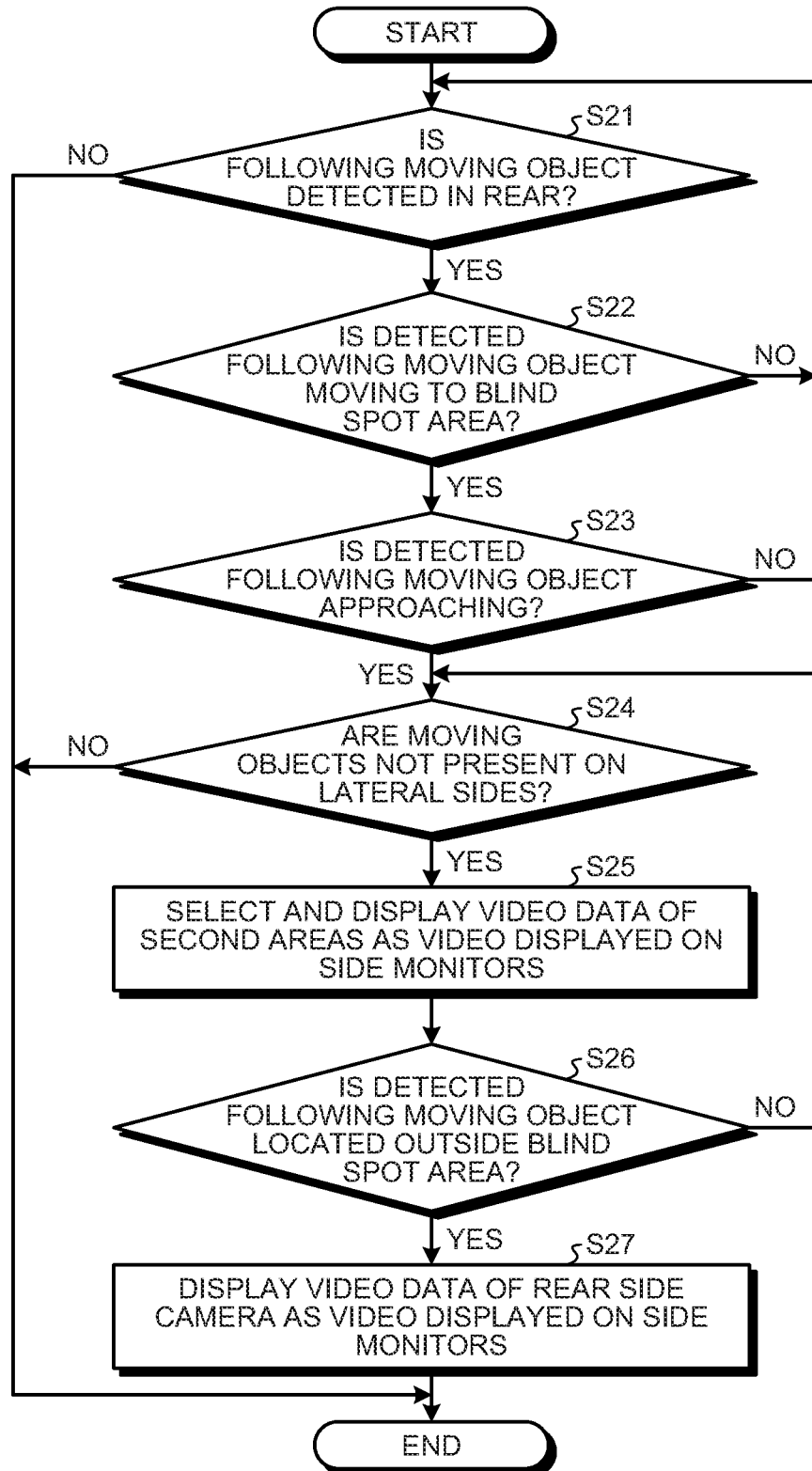
FIG. 9 is a flowchart illustrating flow of a process performed by an on-vehicle display control device of an on-vehicle display system according to a second embodiment.

With reference to FIG. 9, flow of a process performed by an on-vehicle display control device of the on-vehicle display system will be described. FIG. 9 is a flowchart illustrating the flow of the process performed by the on-vehicle display control device of the on-vehicle display system according to the second embodiment.

The display controller performs processes at Step S21 to Step S27. The processes at Step S21 and Step S23 are the same as the processes at Step S11 and Step S13 in the flowchart illustrated in FIG. 6, and the processes at Step S24 to Step S27 are the same as the processes at Step S14 to Step S17 in the flowchart illustrated in FIG. 6.

The display controller determines whether the following moving object V is moving from the first area AC, the second area AR, or the second area AL to the blind spot area BR or the blind spot area BL (Step S22). More specifically, the display controller determines whether the detecting unit has detected that the following moving object V is moving from the first area AC, the second area AR, or the second area AL to the blind spot area BR or the blind spot area BL.

If the display controller determines that the following moving object V is not moving from the first area AC, the second area AR, or the second area AL to the blind spot area BR or the blind spot area BL (No at Step S22), the process returns to Step S21 to be repeated.

If the display controller determines that the following moving object V is moving from the first area AC, the second area AR, or the second area AL to the blind spot area BR or the blind spot area BL (Yes at Step S22), the process proceeds to Step S23.

Figure 10:
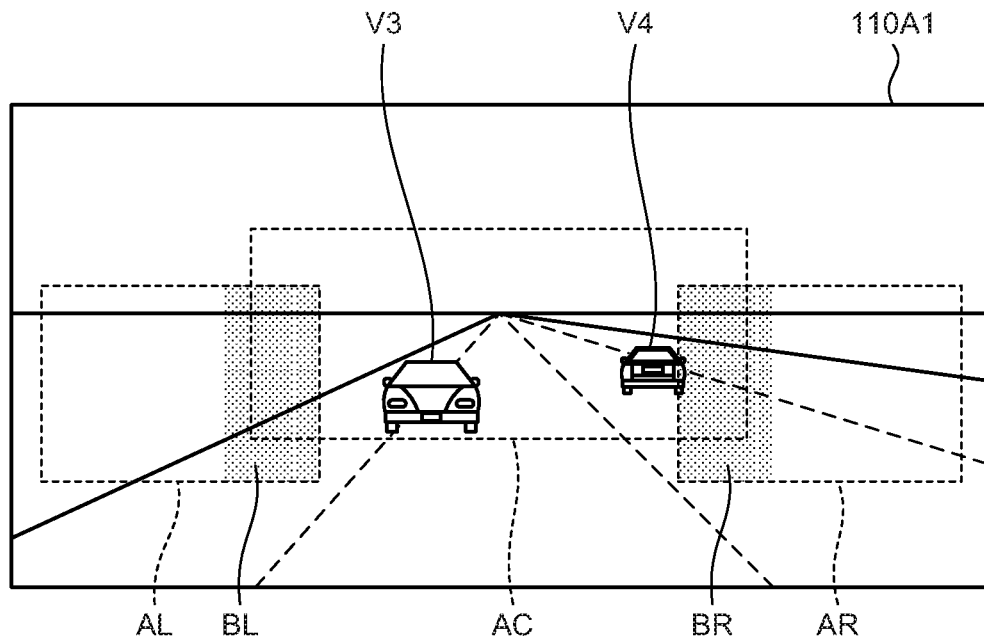
FIG. 10 is a diagram illustrating an example of video data captured by the rear camera of the on-vehicle display system according to the second embodiment.
Figure 11:
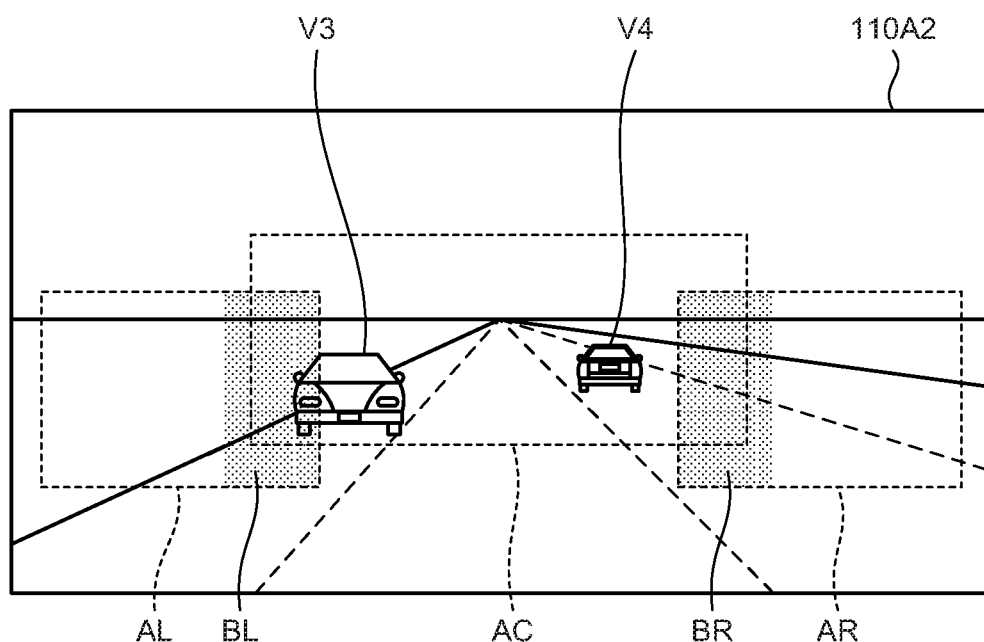
FIG. 11 is a diagram illustrating another example of video data captured by the rear camera of the on-vehicle display system according to the second embodiment.

With reference to FIG. 10 and FIG. 11, a concrete example of the blind spot display process performed by the display controller according to the second embodiment will be described. FIG. 10 is a diagram illustrating an example of video data captured by a rear camera of the on-vehicle display system according to the second embodiment. FIG. 11 is a diagram illustrating another example of video data captured by the rear camera of the on-vehicle display system according to the second embodiment. FIG. 11 illustrates a state obtained slightly after a state illustrated in FIG. 10. It is assumed that a following moving object V3 is moving from the first area AC to the blind spot area BL and a following moving object V4 is receding from the vehicle 100 as displayed in first video data 110A1 and first video data 110A2. At Step S21, the display controller determines that the following moving objects V3 and V4 are detected in the first video data 110A1 (Yes at Step S21). Subsequently, the display controller determines that the following moving object V3 is moving from the first area AC to the blind spot area BL (Yes at Step S22). Then, it is determined that the following moving object V3 is approaching (Yes at Step S23). Subsequently, it is determined that the moving object is not present on the lateral sides of the vehicle 100 (Yes at Step S24). Then, at Step S25, the display controller displays the second left rear video data 110L3 on the left side monitor 160.

Figure 12:
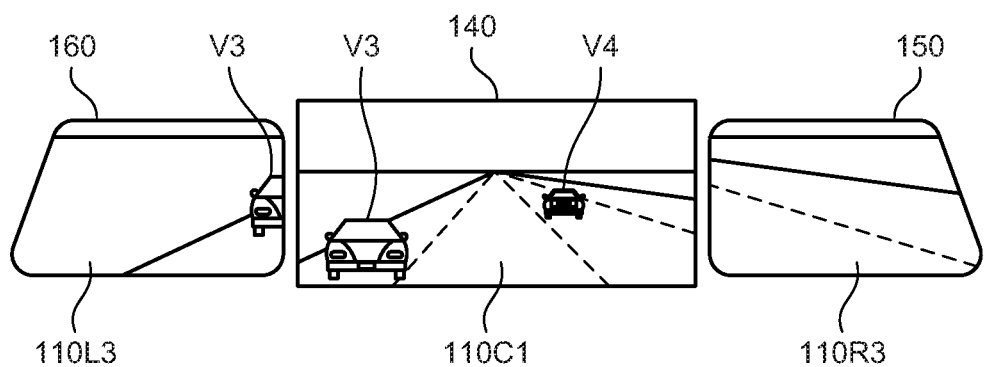
FIG. 12 is a diagram illustrating an example of video displayed on a rearview monitor, a right side monitor, and a left side monitor of the on-vehicle display system according to the second embodiment.

Specifically, as illustrated in FIG. 12, the display controller displays the second left rear video data 110L3, in which the following moving object V3 is reflected, on the left side monitor 160, and displays the second right rear video data 110R3 on the right side monitor 150. FIG. 12 is a diagram illustrating an example of video displayed on the rearview monitor, the right side monitor, and the left side monitor of the on-vehicle display system according to the second embodiment.

Figure 13:
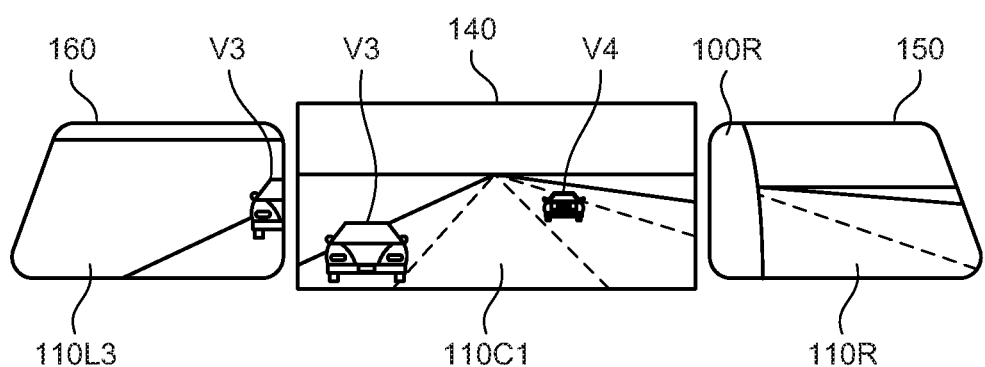
FIG. 13 is a diagram illustrating another example of video displayed on the rearview monitor, the right side monitor, and the left side monitor of the on-vehicle display system according to the second embodiment.

Alternatively, as illustrated in FIG. 13, the display controller may display the second left rear video data 110L3, in which the following moving object V3 is reflected, on the left side monitor 160, and displays the first right rear video data 110R, which is the normal display, on the right side monitor 150. FIG. 13 is a diagram illustrating another example of video displayed on the rearview monitor, the right side monitor, and the left side monitor of the on-vehicle display system according to the second embodiment.

In this manner, when the display controller detects the following moving object V moving to the blind spot area BR or the blind spot area BL, the on-vehicle display system 1 displays the second right rear video data 110R3 and the second left rear video data 110L3 on the right side monitor 150 and the left side monitor 160.

As described above, when the following moving object V moving to the blind spot area BR or the blind spot area BL is detected, the on-vehicle display system according to the second embodiment displays the second right rear video data 110R3 or the second left rear video data 110L3, which is clipped from the first video data 110A, on the right side monitor 150 or the left side monitor 160. Therefore, the on-vehicle display system 1 can appropriately display the following moving object V. Consequently, the on-vehicle display system 1 allows the driver to check surroundings of the vehicle 100 appropriately.

Third Embodiment

Figure 14:
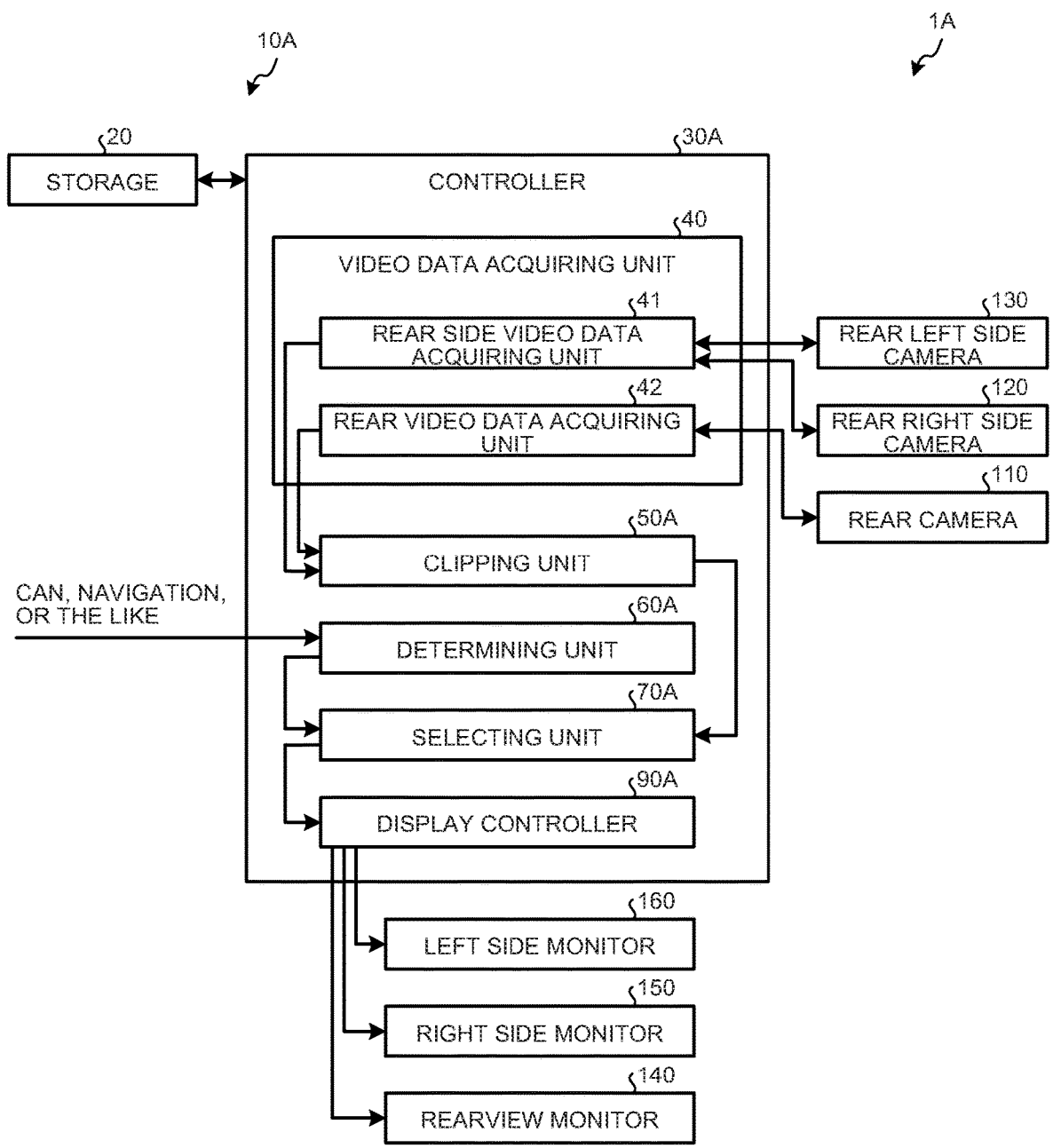
FIG. 14 is a block diagram illustrating a configuration example of an on-vehicle display system according to a third embodiment.

With reference to FIG. 14 to FIG. 18, an on-vehicle display system according to a third embodiment will be described. FIG. 14 is a block diagram illustrating a configuration example of the on-vehicle display system according to the third embodiment. An on-vehicle display system 1A according to the third embodiment illustrated in FIG. 14 is different from that of the first embodiment in that an on-vehicle display control device 10A is configured differently.

Figure 15:
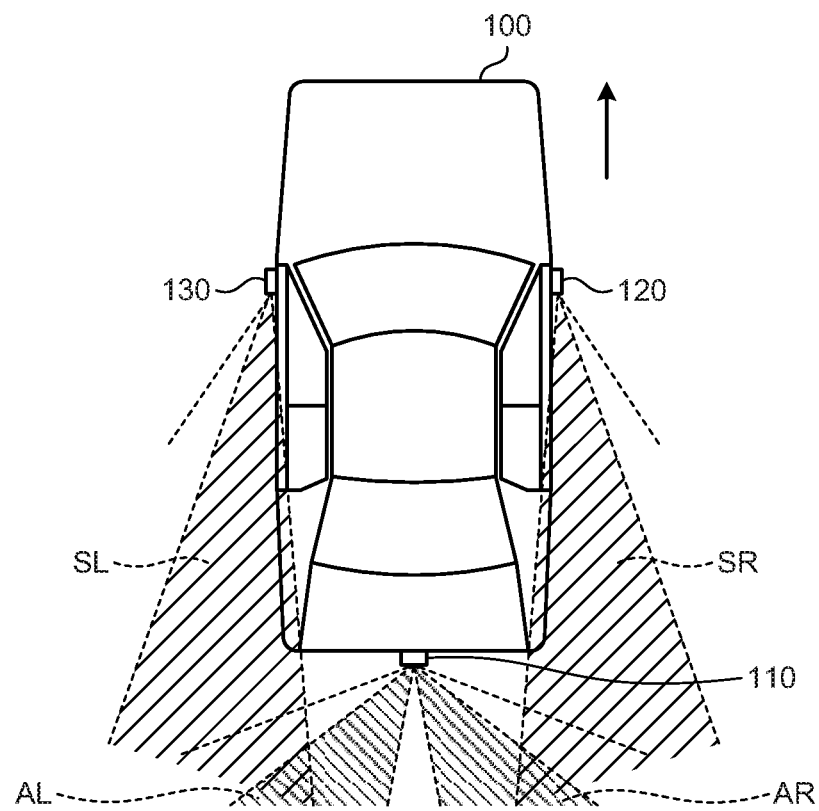
FIG. 15 is a schematic diagram illustrating a configuration example of the on-vehicle display system according to the third embodiment.
Figure 16:
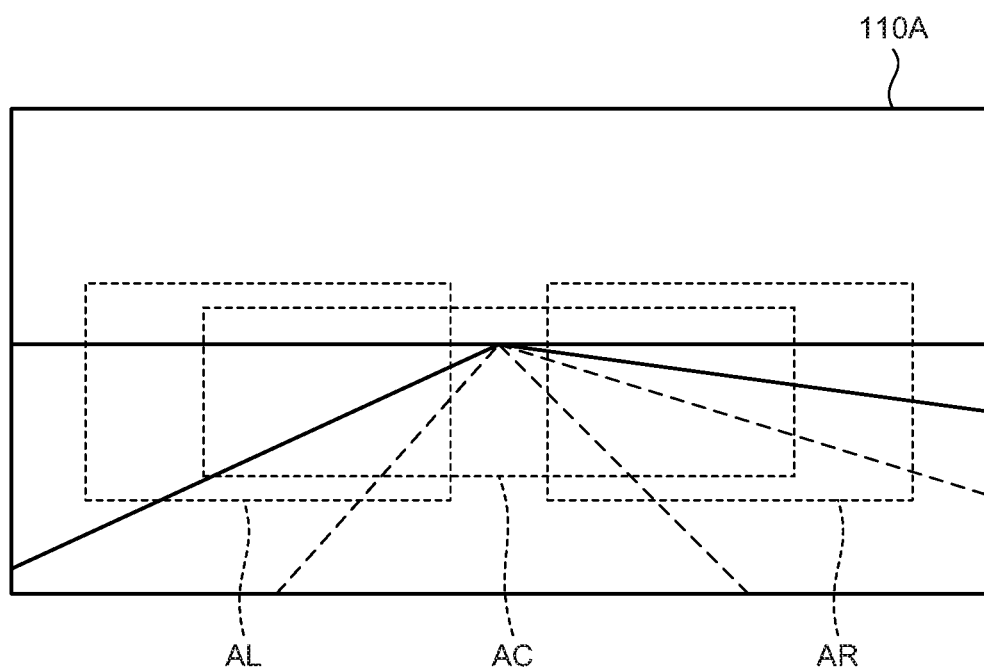
FIG. 16 is a diagram illustrating an example of video data captured by a rear camera of the on-vehicle display system according to the third embodiment.

With reference to FIG. 15 and FIG. 16, an imaging range of the rear camera 110 will be described. FIG. 15 is a schematic diagram illustrating a configuration example of the on-vehicle display system according to the third embodiment. FIG. 16 is a diagram illustrating an example of video data captured by a rear camera of the on-vehicle display system according to the third embodiment. Specifically, the rear camera 110 captures the first video data 110A as illustrated in FIG. 16.

The rear right side camera 120 images an imaging range SR as illustrated in FIG. 15. The rear right side camera 120 outputs captured second video data to the rear side video data acquiring unit 41 of the video data acquiring unit 40 of the on-vehicle display control device 10A.

The rear left side camera 130 images an imaging range SL as illustrated in FIG. 15. The rear left side camera 130 outputs captured second video data to the rear side video data acquiring unit 41 of the video data acquiring unit 40 of the on-vehicle display control device 10A.

Figure 17:
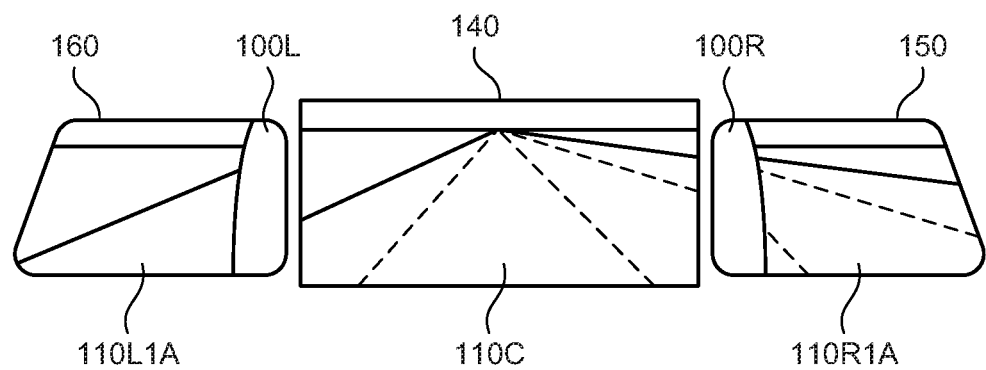
FIG. 17 is a diagram illustrating an example of video displayed on a rearview monitor, a right side monitor, and a left side monitor of the on-vehicle display system according to the third embodiment.

Specifically, the rearview monitor 140 displays rear video as illustrated in FIG. 17. FIG. 17 is a diagram illustrating an example of video displayed on the rearview monitor, the right side monitor, and the left side monitor of the on-vehicle display system according to the third embodiment.

Specifically, the right side monitor 150 displays right rear video as illustrated in FIG. 17 at the time of normal display.

Specifically, the left side monitor 160 displays left rear video as illustrated in FIG. 17 at the time of normal display.

Referring back to FIG. 14, the on-vehicle display control device 10A includes the storage 20 and a controller 30A.

The controller 30A includes the video data acquiring unit 40, a clipping unit 50A, a determining unit 60A, a selecting unit 70A, and a display controller 90A.

The rear video data acquiring unit 42 outputs the acquired first video data 110A to the clipping unit 50A.

The clipping unit 50A clips, from the second video data, first right video data 110R1A and first left video data 110L1A for the right side monitor 150 and the left side monitor 160. As the video data displayed on the right side monitor 150, the second video data captured by the rear right side camera 120 may be displayed without clipping, or data clipped as the first right video data 110R1A may be displayed. As the video data displayed on the left side monitor 160, the second video data captured by the rear left side camera 130 may be displayed without clipping, or data clipped as the first left video data 110L1A may be displayed.

The clipping unit 50A clips the second area AR and the second area AL from the first video data 110A. More specifically, the clipping unit 50A clips the second area AR, which is located on a lateral side of the first area AC in the first video data 110A, as second right video data 110R2A (the second right rear video data of the first embodiment). The clipping unit 50A clips the second area AL, which is located on a lateral side of the first area AC in the first video data 110A, as second left video data 110L2A (the second left rear video data of the first embodiment). Information on a target area to be adopted as the second area AR and the second area AL in the first video data 110A is stored in the storage 20 in advance.

In the present embodiment, as illustrated in FIG. 16, central axis lines of the second area AR and the second area AL in the horizontal direction match a central axis line of the first area AC in the horizontal direction.

Figure 18:
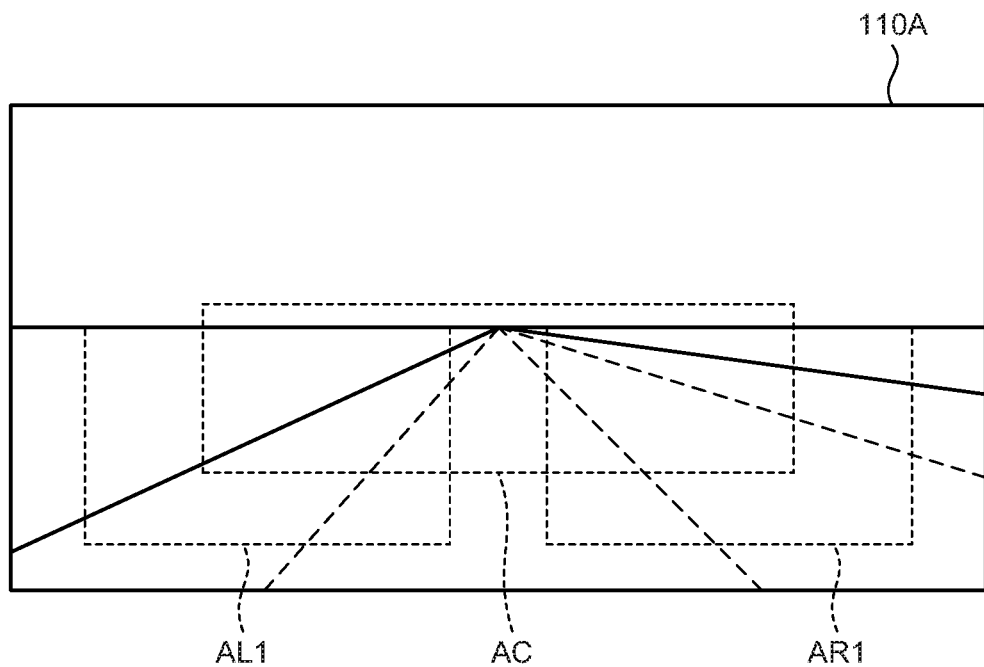
FIG. 18 is a diagram illustrating another example of video data captured by the rear camera of the on-vehicle display system according to the third embodiment.

Alternatively, as illustrated in FIG. 18, the central axis lines of a second area AR1 and a second area AL1 in the horizontal direction may be positioned below the central axis line of the first area AC in the horizontal direction. FIG. 18 is a diagram illustrating another example of video data captured by the rear camera of the on-vehicle display system according to the third embodiment.

The clipping unit 50A configured as above outputs the clipped first right video data 110R1A, the clipped first left video data 110L1A, the clipped second right video data 110R2A, the clipped second left video data 110L2A, and the clipped rear video data 110C to the selecting unit 70A.

The determining unit 60A determines a running state of the vehicle 100. The determining unit 60A determines the running state based on information acquired from an engine controller (ECU) of the vehicle 100. More specifically, the determining unit 60A acquires information including a vehicle speed, for example. The determining unit 60A determines whether the vehicle 100 keeps running at a predetermined speed or higher. Specifically, for example, the determining unit 60A determines whether the vehicle 100 keeps running at a vehicle speed of 30 km/h or higher for 10 seconds or longer. Alternatively, the determining unit 60A may determine whether the vehicle 100 keeps running at a predetermined speed or higher and is operating with auto cruise control. The determining unit 60A outputs a determination result to the selecting unit 70A.

The selecting unit 70A selects one of a set of the first right video data 110R1A and the first left video data 110L1A and a set of the second right video data 110R2A and the second left video data 110L2A based on the running state determined by the determining unit 60A. More specifically, when the determining unit 60A determines that the vehicle 100 is running at a predetermined speed or higher, the selecting unit 70A selects the second right video data 110R2A and the second left video data 110L2A. When the determining unit 60A determines that the vehicle 100 is running at a speed lower than the predetermined speed, the selecting unit 70A selects the first right video data 110R1A and the first left video data 110L1A. In other words, the selecting unit 70A ordinary selects the first right video data 110R1A and the first left video data 110L1A. The selecting unit 70A outputs a selection result to the display controller 90A.

The display controller 90A displays video data selected by the selecting unit 70A on the right side monitor 150 and the left side monitor 160. More specifically, the display controller 90A displays the first right video data 110R1A and the first left video data 110L1A on the right side monitor 150 and the left side monitor 160 as a normal display process that is performed ordinary. When the determining unit 60A determines that a predetermined condition is satisfied, the display controller 90A displays the second right video data 110R2A and the second left video data 110L2A on the right side monitor 150 and the left side monitor 160.

Figure 19:
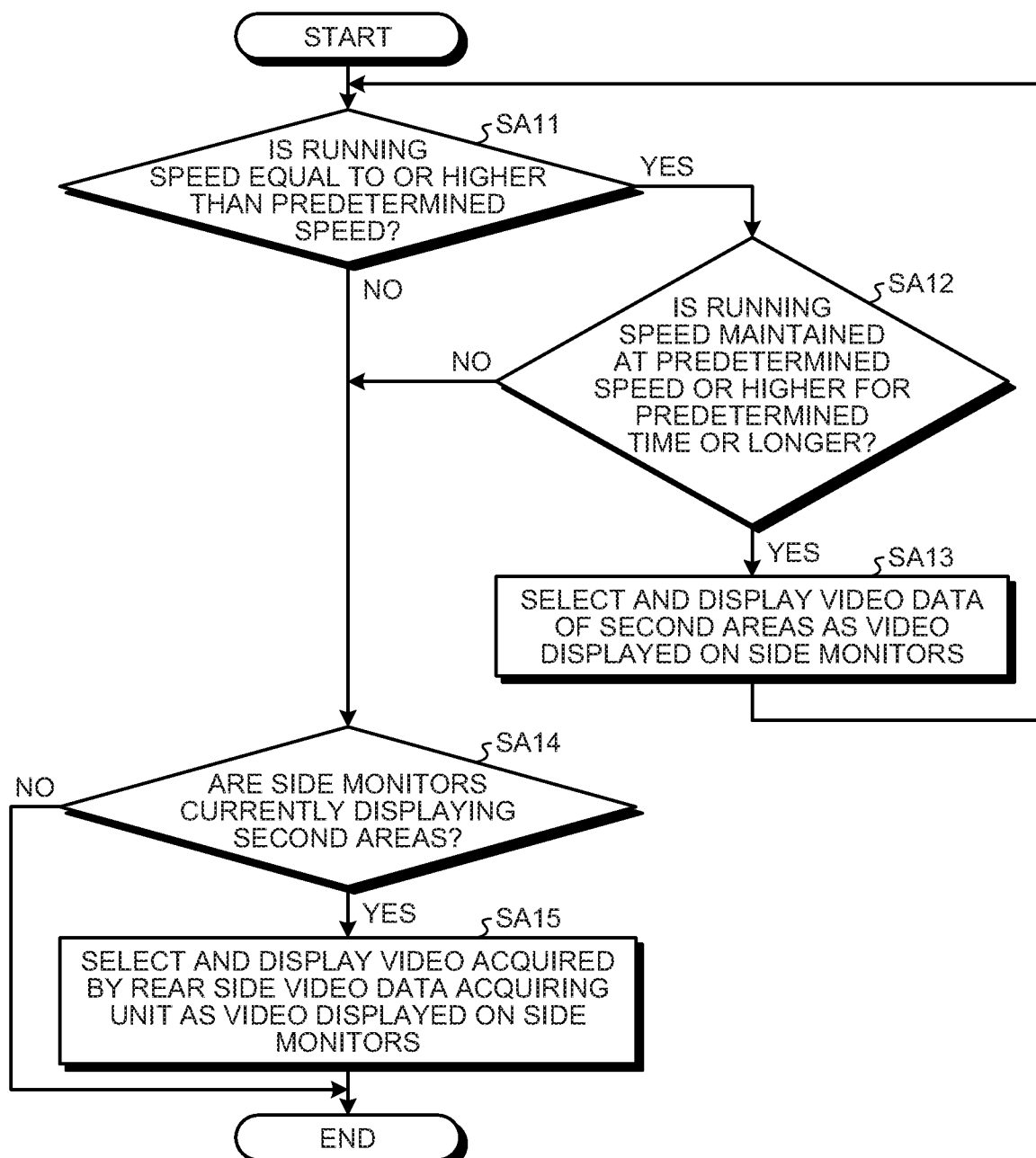
FIG. 19 is a flowchart illustrating flow of a process performed by a controller of the on-vehicle display control device of the on-vehicle display system according to the third embodiment.

Next, with reference to FIG. 19, flow of a process performed by the controller 30A will be described. FIG. 19 is a flowchart illustrating the flow of the process performed by the controller of the on-vehicle display control device of the on-vehicle display system according to the third embodiment. This process is performed while the on-vehicle display system 1A is activated.

The controller 30A determines whether a running speed of the vehicle 100 is equal to or higher than a predetermined speed (Step SA11). More specifically, the controller 30A determines whether the determining unit 60A has determined that the running speed of the vehicle 100 is equal to or higher than the predetermined speed.

If the determining unit 60A has not determined that the running speed of the vehicle 100 is equal to or higher than the predetermined speed (No at Step SA11), the controller 30A proceeds to Step SA14.

If the determining unit 60A has determined that the running speed of the vehicle 100 is maintained at the predetermined speed or higher (Yes at Step SA11), the controller 30A proceeds to Step SA12.

The controller 30A determines whether the running speed of the vehicle 100 is maintained at the predetermined speed or higher for a predetermined time or longer (Step SA12). More specifically, the controller 30A determines whether the determining unit 60A has determined that a state in which the running speed of the vehicle 100 is maintained at the predetermined speed or higher has been continued for a predetermined time or longer.

If the determining unit 60A has determined that the running speed of the vehicle 100 is not maintained at the predetermined speed or higher for the predetermined time or longer (No at Step SA12), the controller 30A proceeds to Step SA14.

If the determining unit 60A has determined that the running speed of the vehicle 100 is maintained at the predetermined speed or higher for the predetermined time or longer (Yes at Step SA12), the controller 30A proceeds to Step SA13.

The controller 30A selects and displays the second right video data 110R2A and the second left video data 110L2A of the second area AR and the second area AL as video displayed on the right side monitor 150 and the left side monitor 160 (Step SA13). More specifically, the controller 30A causes the selecting unit 70A to select the second right video data 110R2A and the second left video data 110L2A. Then, the display controller 90A displays the second right video data 110R2A and the second left video data 110L2A on the right side monitor 150 and the left side monitor 160.

The controller 30A determines whether the right side monitor 150 and the left side monitor 160 are currently displaying the second right video data 110R2A and the second left video data 110L2A of the second area AR and the second area AL (Step SA14).

If the controller 30A determines that the right side monitor 150 and the left side monitor 160 are not currently displaying the second right video data 110R2A and the second left video data 110L2A of the second area AR and the second area AL (No at Step SA14), the process ends.

If the controller 30A determines that the right side monitor 150 and the left side monitor 160 are currently displaying the second right video data 110R2A and the second left video data 110L2A of the second area AR and the second area AL (Yes at Step SA14), the process proceeds to Step SA15.

The controller 30A selects and displays the second video data acquired by the rear side video data acquiring unit 41 as video displayed on the right side monitor 150 and the left side monitor 160 (Step SA15). More specifically, the controller 30A causes the selecting unit 70A to select the first right video data 110R1A and the first left video data 110L1A. Then, the display controller 90A displays the first right video data 110R1A and the first left video data 110L1A on the right side monitor 150 and the left side monitor 160.

Figure 20:
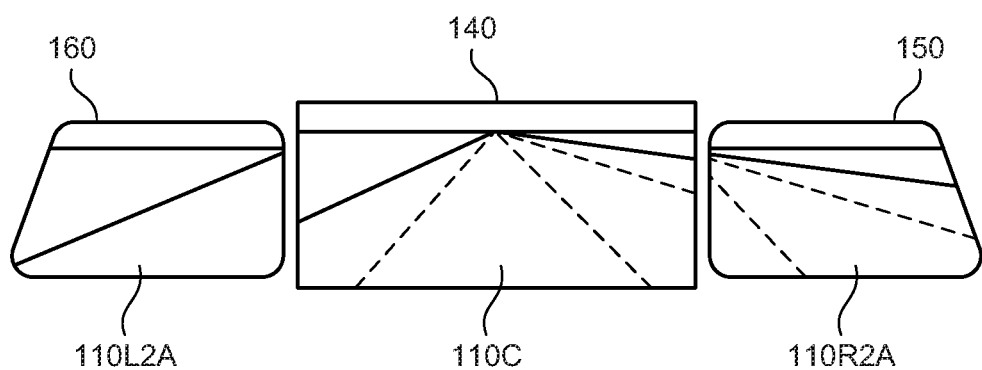
FIG. 20 is a diagram illustrating another example of video displayed on the rearview monitor, the right side monitor, and the left side monitor of the on-vehicle display system according to the third embodiment.

Specifically, when the second area AR and the second area AL are set as illustrated in FIG. 16, the controller 30A displays the second right video data 110R2A and the second left video data 110L2A on the right side monitor 150 and the left side monitor 160 as illustrated in FIG. 20. FIG. 20 is a diagram illustrating another example of video displayed on the rearview monitor, the right side monitor, and the left side monitor of the on-vehicle display system according to the third embodiment.

Figure 21:
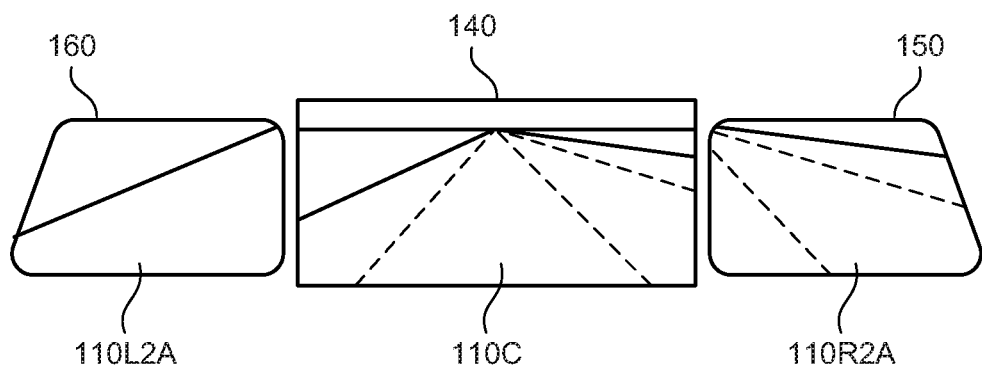
FIG. 21 is a diagram illustrating still another example of video displayed on the rearview monitor, the right side monitor, and the left side monitor of the on-vehicle display system according to the third embodiment.

Alternatively, when the second area AR1 and the second area AL1 are set as illustrated in FIG. 18, the controller 30A displays the second right video data 110R2A and the second left video data 110L2A on the right side monitor 150 and the left side monitor 160 as illustrated in FIG. 21. FIG. 21 is a diagram illustrating another example of video displayed on the rearview monitor, the right side monitor, and the left side monitor of the on-vehicle display system according to the third embodiment.

In this manner, the on-vehicle display system 1A displays video data, which is selected by the selecting unit 70A based on the running state of the vehicle 100 determined by the determining unit 60A, on the right side monitor 150 and the left side monitor 160.

As described above, the on-vehicle display system 1A according to the third embodiment displays video data, which is selected by the selecting unit 70A based on the running state of the vehicle 100 determined by the determining unit 60A, on the right side monitor 150 and the left side monitor 160. In this manner, the on-vehicle display system 1A can display appropriate video data on the right side monitor 150 and the left side monitor 160 based on the running state of the vehicle 100. Specifically, when the vehicle 100 keeps running at a predetermined speed or higher for a predetermined time or longer, the on-vehicle display system 1A displays the second right video data 110R2A and the second left video data 110L2A on the right side monitor 150 and the left side monitor 160. With this operation, when the vehicle 100 keeps running at the predetermined speed or higher for the predetermined time or longer, it is possible to check the rear side in priority to the lateral sides using the second right video data 110R2A and the second left video data 110L2A that do not include the blind spots of the vehicle 100. In contrast, it is possible to check the lateral sides of the vehicle 100 using the first right video data 110R1A and the first left video data 110L1A. Consequently, the on-vehicle display system 1 allows the driver to check surroundings of the vehicle 100 appropriately, depending on the running state.

Fourth Embodiment

Figure 22:
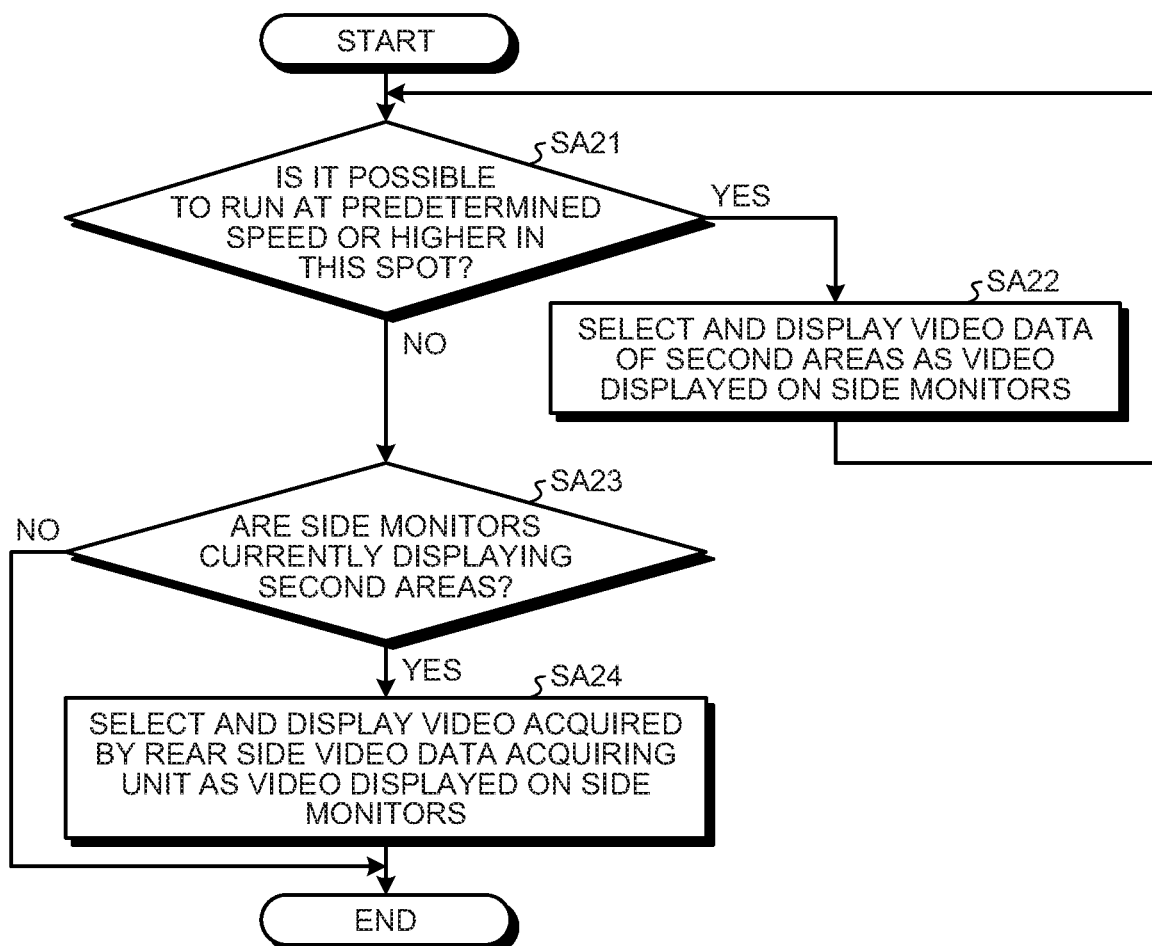
FIG. 22 is a flowchart illustrating flow of a process performed by a controller of an on-vehicle display control device of an on-vehicle display system according to a fourth embodiment.

With reference to FIG. 22, an on-vehicle display system according to a fourth embodiment will be described. FIG. 22 is a flowchart illustrating flow of a process performed by a controller of an on-vehicle display control device of the on-vehicle display system according to the fourth embodiment. A basic configuration of the on-vehicle display system is the same as that of the on-vehicle display system 1A of the third embodiment. In the following descriptions, the same components as those of the on-vehicle display system 1A will be denoted by the same reference signs or corresponding reference signs, and detailed explanation thereof will be omitted.

A determining unit 60B acquires information including current location information and map information, for example. The determining unit 60B determines whether a running spot of the vehicle 100 is a spot where running at a predetermined speed or higher is possible. Specifically, for example, the determining unit determines that the running spot of the vehicle 100 is a spot where running at the predetermined speed or higher is possible when the running spot is a suburban road, an expressway, a limited highway, a car racing circuit, or the like. Alternatively, when the vehicle 100 passes through an electronic toll collection (ETC) gate, the determining unit may determine that the running spot of the vehicle 100 is an expressway or a limited highway where running at the predetermined speed or higher is possible. The predetermined speed is, for example, 80 km/h.

If the determining unit determines that the vehicle 100 is running in a spot where running at the predetermined speed or higher is possible, the selecting unit selects the second right video data 110R2A and the second left video data 110L2A. If the determining unit determines that the vehicle 100 is running in a spot where running at the predetermined speed or higher is impossible, the selecting unit selects the first right video data 110R1A and the first left video data 110L1A. In other words, the selecting unit ordinary selects the first right video data 110R1A and the first left video data 110L1A.

The controller determines whether the determining unit has determined that the spot is a spot where running at the predetermined speed or higher is possible (Step SA21). More specifically, the determining unit determines whether a current location of the vehicle 100 is a spot where running at the predetermined speed or higher is possible based on the current location information and the map information acquired from the vehicle 100.

If the determining unit has determined that the spot is not a spot where running at the predetermined speed or higher is possible (No at Step SA21), the controller proceeds to Step SA23.

If the determining unit has determined that the spot is a spot where running at the predetermined speed or higher is possible (Yes at Step SA21), the controller proceeds to Step SA22.

The controller selects and displays the second right video data 110R2A and the second left video data 110L2A of the second area AR and the second area AL as video displayed on the right side monitor 150 and the left side monitor 160 (Step SA22). More specifically, the controller causes the selecting unit to select the second right video data 110R2A and the second left video data 110L2A, and causes the display controller to display the second right video data 110R2A and the second left video data 110L2A on the right side monitor 150 and the left side monitor 160.

The controller determines whether the right side monitor 150 and the left side monitor 160 are currently displaying the second right video data 110R2A and the second left video data 110L2A of the second area AR and the second area AL (Step SA23).

If the controller determines that the right side monitor 150 and the left side monitor 160 are not currently displaying the second right video data 110R2A and the second left video data 110L2A of the second area AR and the second area AL (No at Step SA23), the process ends.

If the controller determines that the right side monitor 150 and the left side monitor 160 are currently displaying the second right video data 110R2A and the second left video data 110L2A of the second area AR and the second area AL (Yes at Step SA23), the process proceeds to Step SA24.

The controller selects and displays the second video data acquired by the rear side video data acquiring unit 41 as video displayed on the right side monitor 150 and the left side monitor 160 (Step SA24). More specifically, the controller causes the selecting unit to select the first right video data 110R1A and the first left video data 110L1A, and causes the display controller to display the first right video data 110R1A and the first left video data 110L1A on the right side monitor 150 and the left side monitor 160.

In this manner, the on-vehicle display system displays, on the right side monitor 150 and the left side monitor 160, the video data that is selected by the selecting unit based on the running state of the vehicle 100 determined by the determining unit.

As described above, the on-vehicle display system according to the present embodiment can provide appropriate display on the right side monitor 150 and the left side monitor 160 based on the running state of the vehicle 100, similarly to the third embodiment. Specifically, when the current location of the vehicle 100 is a spot where running at a predetermined speed or higher is possible, the on-vehicle display system displays the second right video data 110R2A and the second left video data 110L2A on the right side monitor 150 and the left side monitor 160. With this operation, when the current location of the vehicle 100 is a spot where running at the predetermined speed or higher is possible, it is possible to check the rear side in priority to the lateral sides using the second right video data 110R2A and the second left video data 110L2A that do not include the blind spots of the vehicle 100. In contrast, it is ordinary possible to check the lateral sides of the vehicle 100 using the first right video data 110R1A and the first left video data 110L1A. Therefore, the on-vehicle display system can appropriately check surroundings of the vehicle 100 depending on the running state.

Fifth Embodiment

Figure 23:
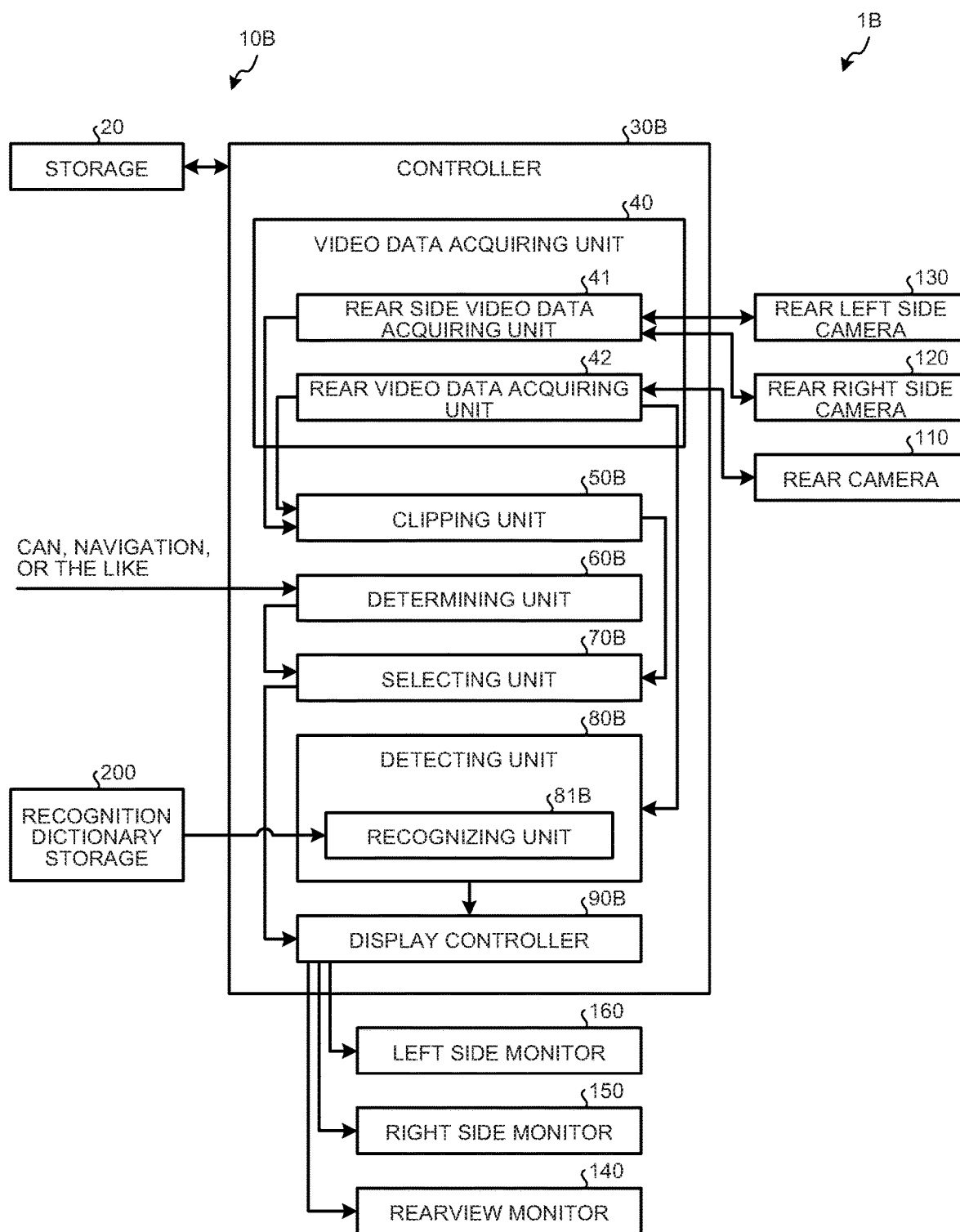
FIG. 23 is a block diagram illustrating a configuration example of an on-vehicle display system according to a fifth embodiment.
Figure 24:
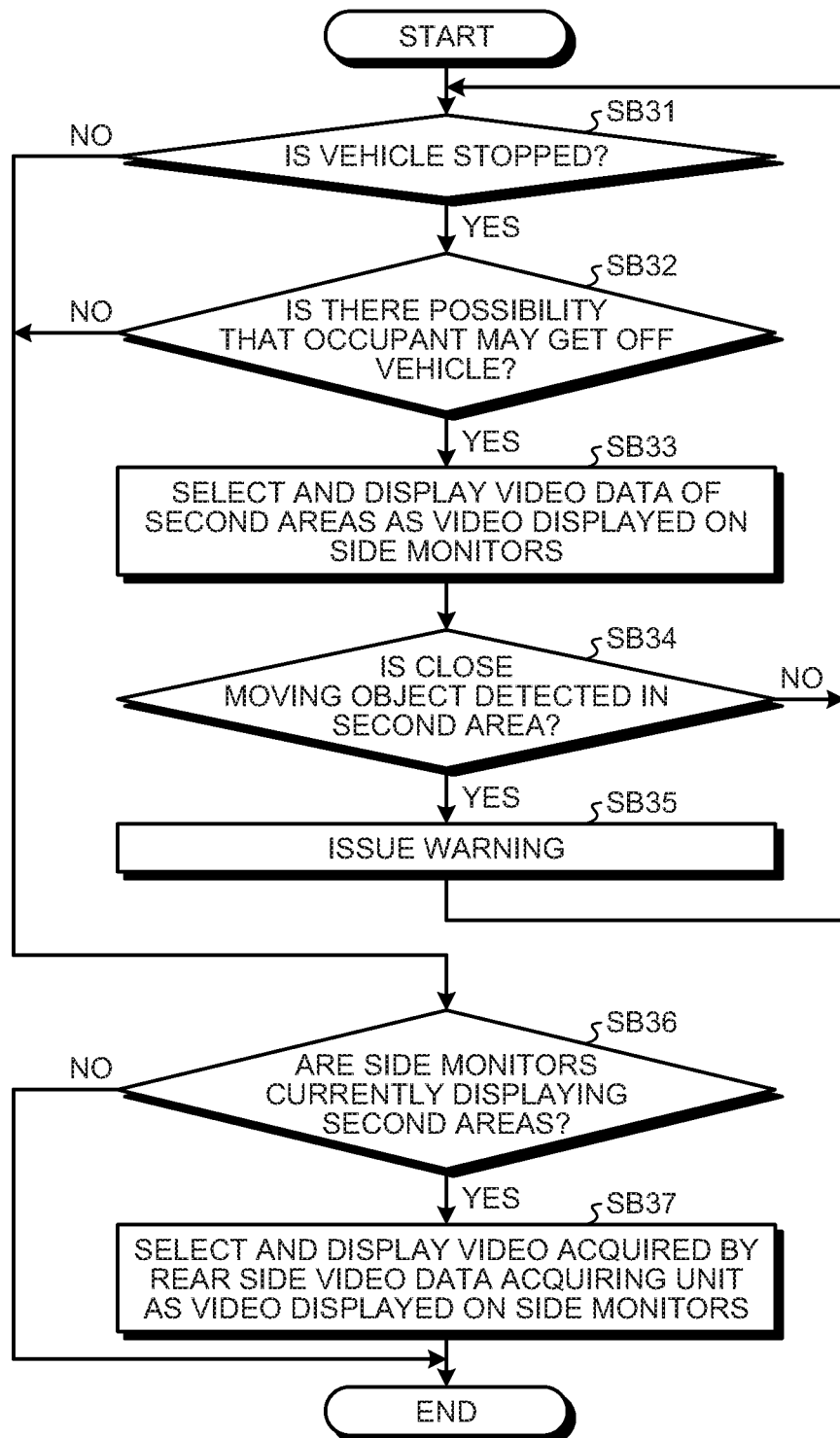
FIG. 24 is a flowchart illustrating flow of a process performed by a controller of an on-vehicle display control device of the on-vehicle display system according to the fifth embodiment.

With reference to FIG. 23 and FIG. 24, an on-vehicle display system according to a fifth embodiment will be described. FIG. 23 is a block diagram illustrating a configuration example of the on-vehicle display system according to the fifth embodiment. An on-vehicle display system 1B according to the fifth embodiment illustrated in FIG. 23 is different from that of the third embodiment in that an on-vehicle display control device 10B is configured differently.

The recognition dictionary storage 200 stores therein, for example, a recognition dictionary that enables matching of patterns, such as shapes in a front view or the like, sizes, and colors of moving objects including four-wheel vehicles, two-wheel vehicles, and persons.

The on-vehicle display control device 10B includes the storage 20 and a controller 30B.

The controller 30B includes the video data acquiring unit 40, a clipping unit 50B, a determining unit 60B, a selecting unit 70B, a detecting unit 80B, and a display controller 90B.

The rear video data acquiring unit 42 outputs the acquired first video data 110A to the clipping unit 50B and the detecting unit 80B.

The determining unit 60B acquires, for example, a vehicle speed and information for determining a possibility that an occupant may get off the vehicle. The information for determining the possibility that an occupant may get off the vehicle is, for example, at least one of unlocking of a door of the vehicle 100, contact with an inner door handle of the vehicle 100, operation on the inner door handle of the vehicle 100, and operation to unfasten an occupant's seat belt, or a combination of a plurality of pieces of the above-described information. The determining unit 60B determines whether the vehicle 100 is stopped and there is the possibility that an occupant may get off the vehicle 100. A state in which the vehicle 100 is stopped in this case may include a state in which the vehicle speed is reduced to below 5 km/h due to deceleration, in addition to a completely stopped state in which the vehicle speed reaches zero. This is to allow an occupant who may get off the vehicle to appropriately check surroundings of the vehicle 100 just before the vehicle is completely stopped. The determining unit 60B outputs a determination result to the selecting unit 70B.

More specifically, when it is detected that the vehicle speed is zero and the door of the vehicle 100 is unlocked, the determining unit 60B determines that there is the possibility that an occupant may get off the vehicle. In other words, when it is detected that the door of the vehicle 100 is unlocked after the vehicle 100 is stopped, the determining unit 60B determines that there is the possibility that an occupant may get off the vehicle. Alternatively, when it is detected that the vehicle speed is zero and the inner door handle of the vehicle 100 is touched, the determining unit 60B determines that there is the possibility that an occupant may get off the vehicle. In other words, when it is detected that the inner door handle of the vehicle 100 is touched after the vehicle 100 is stopped, the determining unit 60B determines that there is the possibility that an occupant may get off the vehicle. Alternatively, when it is detected that the vehicle speed is zero and the inner door handle of the vehicle 100 is operated, the determining unit 60B determines that there is the possibility that an occupant may get off the vehicle. In other words, when it is detected that the inner door handle of the vehicle 100 is operated after the vehicle 100 is stopped, the determining unit 60B determines that there is the possibility that an occupant may get off the vehicle. Alternatively, when it is detected that the vehicle speed is zero and an operation to unfasten an occupant's seat belt is performed, the determining unit 60B determines that there is the possibility that an occupant may get off the vehicle. In other words, when it is detected that the operation to unfasten the occupant's seat belt is performed after the vehicle 100 is stopped, the determining unit 60B determines that there is the possibility that an occupant may get off the vehicle. The determining unit 60B may determine that there is the possibility that an occupant may get off the vehicle based on a combination of a plurality of pieces of the above-described information. The state in which the determining unit 60B determines that there is the possibility that an occupant may get off the vehicle is not limited to the states as described above. Specifically, for example, the determining unit 60B may determine that there is the possibility that an occupant may get off the vehicle when it is detected that a current location of the vehicle 100 is a destination that is set in a navigation system.

If the determining unit 60B determines that the vehicle 100 is stopped and there is the possibility that an occupant may get off the vehicle, the selecting unit 70B selects the second right video data 110R2A and the second left video data 110L2A. If the determining unit 60B does not determine that the vehicle 100 is stopped and there is the possibility that an occupant may get off the vehicle, the selecting unit 70B selects the first right video data 110R1A and the first left video data 110L1A. In other words, the selecting unit 70B ordinary selects the first right video data 110R1A and the first left video data 110L1A. The selecting unit 70B outputs a selection result to the display controller 90B.

The detecting unit 80B detects the moving objects in the first video data 110A. The detecting unit 80B includes a recognizing unit 81B that performs moving object recognition on the first video data 110A and recognizes the moving object. The recognizing unit 81B performs pattern matching on the first video data 110A using the recognition dictionary stored in the recognition dictionary storage 200, and detects presence of the moving object. The recognizing unit 81B recognizes whether the moving object is located to close to or away from the vehicle 100 based on a change in the size of the moving object in each of the frames in the first video data 110A. The detecting unit 80B outputs a detection result to the display controller 90B.

If the determining unit 60B determines that a predetermined condition is satisfied, the display controller 90B displays the first right video data 110R1A and the first left video data 110L1A on the right side monitor 150 and the left side monitor 160.

Next, with reference to FIG. 24, flow of a process performed by the controller 30B will be described. FIG. 24 is a flowchart illustrating the flow of the process performed by the controller of the on-vehicle display control device of the on-vehicle display system according to the fifth embodiment. This process is performed while the on-vehicle display system 1B is activated.

The controller 30B determines whether the determining unit 60B has determined that the vehicle 100 is stopped (Step SB31).

If the determining unit 60B has determined that the vehicle 100 is not stopped (No at Step SB31), the controller 30B proceeds to Step SB36.

If the determining unit 60B has determined that the vehicle 100 is stopped (Yes at Step SB31), the controller 30B proceeds to Step SB32.

The controller 30B determines whether the determining unit 60B has determined that there is a possibility that an occupant may get off the vehicle (Step SB32).

If the determining unit 60B has determined that there is no possibility that an occupant may get off the vehicle (No at Step SB32), the controller 30B proceeds to Step SB36.

If the determining unit 60B has determined that there is the possibility that an occupant may get off the vehicle (Yes at Step SB32), the controller 30B proceeds to Step SB33.

The controller 30B selects and displays the second right video data 110R2A and the second left video data 110L2A of the second area AR and the second area AL as video displayed on the right side monitor 150 and the left side monitor 160 (Step SB33). More specifically, the controller 30B causes the selecting unit 70B to select the second right video data 110R2A and the second left video data 110L2A, and causes the display controller 90B to display the second right video data 110R2A and the second left video data 110L2A on the right side monitor 150 and the left side monitor 160.

The controller 30B determines whether a close moving object is detected in the second area AR or the second area AL (Step SB34). More specifically, if the recognizing unit 81B detects a moving object (following moving object) in the second area AR or the second area AL and determines that the moving object is located close to the vehicle 100, the controller 30B determines that the close moving object is detected in the second area AR or the second area AL.

If the controller 30B does not determine that the close moving object is detected in the second area AR or the second area AL (No at Step SB34), the process returns to Step SB31 to be repeated.

If the controller 30B determines that the close moving object is detected in the second area AR or the second area AL (Yes at Step SB34), the process proceeds to Step SB35.

The controller 30B issues a warning (Step SB35) and returns to Step SB31 to continue the process. More specifically, the controller 30B causes the display controller 90B to display a warning, such as a character or an icon, on the right side monitor 150 or the left side monitor 160 corresponding to the side on which the close moving object is detected at Step SB34 (hereinafter, referred to as a "detection side"). Alternatively, the controller 30B may cause the display controller 90B to display a warning such that the second area AR or the second area AL blinks on and off on the right side monitor 150 or the left side monitor 160 corresponding to the detection side, and cause a speaker to output sound. Alternatively, the controller 30B may cause the display controller 90B to turn on a light on a rear inner side of a door of the vehicle 100 on the detection side to allow the close moving object to recognize door opening operation. Further, the controller 30B may issue a warning when the detection side matches a side on which the determining unit 60B has determined that there is the possibility that an occupant may get off the vehicle. More specifically, the controller 30B may issue a warning when the detection side matches a side on which unlocking of the door of the vehicle 100 is detected. Alternatively, the controller 30B may issue a warning when the detection side matches a side on which contact with the inner door handle of the vehicle 100 is detected. Alternatively, the controller 30B may issue a warning when the detection side matches a side on which operation on the inner door handle of the vehicle 100 is detected. Alternatively, the controller 30 may issue a warning when the detection side matches a side on which operation to unfasten an occupant's seat belt is detected.

The controller 30B determines whether the right side monitor 150 and the left side monitor 160 are currently displaying the second right video data 110R2A and the second left video data 110L2A of the second area AR and the second area AL (Step SB36).

If the controller 30B determines that the right side monitor 150 and the left side monitor 160 are not currently displaying the second right video data 110R2A and the second left video data 110L2A of the second area AR and the second area AL (No at Step SB36), the process ends.

If the controller 30B determines that the right side monitor 150 and the left side monitor 160 are currently displaying the second right video data 110R2A and the second left video data 110L2A of the second area AR and the second area AL (Yes at Step SB36), the process proceeds to Step SB37.

The controller 30B selects and displays the second video data acquired by the rear side video data acquiring unit 41 as video displayed on the right side monitor 150 and the left side monitor 160 (Step SB37). More specifically, the controller 30B causes the selecting unit 70B to select the first right video data 110R1A and the first left video data 110L1A. Then, the display controller 90B displays the first right video data 110R1A and the first left video data 110L1A on the right side monitor 150 and the left side monitor 160.

Specifically, when the second area AR and the second area AL are set as illustrated in FIG. 16, the controller 30B displays the second right video data 110R2A and the second left video data 110L2A on the right side monitor 150 and the left side monitor 160 as illustrated in FIG. 20.

Alternatively, when the second area AR1 and the second area AL1 are set as illustrated in FIG. 18, the controller 30B displays the second right video data 110R2A and the second left video data 110L2A on the right side monitor 150 and the left side monitor 160 as illustrated in FIG. 21.

In this manner, the on-vehicle display system 1B displays the video data, which is selected by the selecting unit 70B based on the running state of the vehicle 100 determined by the determining unit 60B, on the right side monitor 150 and the left side monitor 160.

As described above, the on-vehicle display system 1B according to the present embodiment displays the video data, which is selected by the selecting unit 70B based on the running state of the vehicle 100 determined by the determining unit 60B, on the right side monitor 150 and the left side monitor 160. In this manner, the on-vehicle display system 1B can display appropriate video data on the right side monitor 150 and the left side monitor 160 based on the running state of the vehicle 100. Specifically, when the vehicle 100 keeps running at a predetermined speed or higher for a predetermined time or longer, the on-vehicle display system 1B displays the second right video data 110R2A and the second left video data 110L2A on the right side monitor 150 and the left side monitor 160. With this operation, when the vehicle 100 keeps running at the predetermined speed or higher for the predetermined time or longer, it is possible to check the rear side in priority to the lateral sides using the second right video data 110R2A and the second left video data 110L2A that do not include the blind spots of the vehicle 100. In contrast, it is ordinary possible to check the lateral sides of the vehicle 100 using the first right video data 110R1A and the first left video data 110L1A. In this manner, the on-vehicle display system 1B can appropriately check surroundings of the vehicle 100 depending on the running state.

In this manner, the on-vehicle display system 1B displays the video data, which is selected by the selecting unit 70B based on the running state of the vehicle 100 determined by the determining unit 60B, on the right side monitor 150 and the left side monitor 160.

As described above, the on-vehicle display system 1B according to the present embodiment displays the video data, which is selected by the selecting unit 70B based on the running state of the vehicle 100 determined by the determining unit 60B, on the right side monitor 150 and the left side monitor 160. In this manner, the on-vehicle display system 1B can provide appropriate display on the right side monitor 150 and the left side monitor 160 based on the running state of the vehicle 100. Specifically, when the vehicle 100 is stopped and there is a possibility that an occupant may get off the vehicle, the on-vehicle display system 1B displays the second right video data 110R2A and the second left video data 110L2A on the right side monitor 150 and the left side monitor 160. With this operation, when the vehicle 100 is stopped and there is the possibility that an occupant may get off the vehicle, it is possible to check the rear side in priority to the lateral sides using the second right video data 110R2A and the second left video data 110L2A that do not include the blind spots of the vehicle 100. In contrast, it is ordinary possible to check the lateral sides of the vehicle 100 using the first right video data 110R1A and the first left video data 110L1A. Therefore, the on-vehicle display system 1B can appropriately check surroundings of the vehicle 100 depending on the running state.

If there is a possibility that an occupant may get off the vehicle and a close moving object is detected in the second area AR or the second area AL, the on-vehicle display system 1B notifies the occupant that there is the close moving object and notifies the close moving object that door opening operation is performed. With this operation, the on-vehicle display system 1B can ensure the safety of the occupant when the occupant gets off the vehicle.

In the embodiment described above, the selecting unit 70B selects the second right video data 110R2A and the second left video data 110L2A when the determining unit 60B determines that the vehicle 100 is stopped and there is a possibility that an occupant may get off the vehicle, and selects the first right video data 110R1A and the first left video data 110L1A in other cases. The determining unit 60B may separately determine the possibility that an occupant may get off the vehicle on each of the left side and the right side. In this case, the selecting unit 70B separately selects video data for each of the left side and the right side.

If the determining unit 60B determines that there is a possibility that an occupant sitting on the right side of the vehicle 100 may get off the vehicle, or if the determining unit 60B determines that there is a possibility that an occupant may get off the vehicle based on unlocking of the door or operation on the inner door handle on the right side of the vehicle 100, the selecting unit 70B selects the second right video data 110R2A as video displayed on the right side monitor 150. In this case, the first left video data 110L1A is continuously displayed as video displayed on the left side monitor 160.

If the determining unit 60B determines that there is a possibility that an occupant sitting on the left side of the vehicle 100 may get off the vehicle, or if the determining unit 60B determines that there is a possibility that an occupant may get off the vehicle based on unlocking of the door or operation on the inner door handle on the left side of the vehicle 100, the selecting unit 70B selects the second left video data 110L2A as video displayed on the left side monitor 160. In this case, the first right video data 110R1A is continuously displayed as video displayed on the right side monitor 150.

If it is determined that there is a possibility that an occupant may get off the vehicle, the on-vehicle display system 1B may maintain display on the right side monitor 150 and the left side monitor 160 for a predetermined time after the engine of the vehicle 100 is stopped. If the vehicle 100 is an electric vehicle (EV), electric power needed for display on the right side monitor 150 and the left side monitor 160 can be supplied from a battery. Further, after a predetermined time has elapsed or if an occupant got off the vehicle and it is detected that the door of the vehicle 100 is locked, the on-vehicle display system 1B turns off the display on the right side monitor 150 and the left side monitor 160.

The components of the on-vehicle display systems 1, 1A, and 1B illustrated in the drawings are functionally conceptual, and need not be physically configured in the manner illustrated in the drawings. In other words, specific forms of the devices are not limited to those illustrated in the drawings, and all or part of the devices may be functionally or physically distributed or integrated in arbitrary units depending on various loads or use conditions.

The configurations of the on-vehicle display systems 1, 1A, and 1B are realized as software by a program or the like loaded on a memory, for example. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present application, various omission, replacement, and modifications of the components may be made.

When a plurality of following moving objects V are detected in the first video data 110A at Step S11 in the flowchart illustrated in FIG. 6, the display controller 90 may perform the processes from Step S12 for the following moving objects V that meet a predetermined condition. More specifically, when a plurality of following moving objects V are detected in the first video data 110A, the display controller 90 may perform the processes from Step S12 for the following moving object V located at the shortest distance from the vehicle 100 on each of the blind spot area BR side and the blind spot area BL side in the first video data 110A. With this operation, the on-vehicle display system 1 can check the following moving object V, such as the closest object, that needs to be checked more preferentially from among the plurality of the detected following moving objects V. In this manner, the on-vehicle display system 1 can appropriately check surroundings of the vehicle 100.

The display controller 90 may determine whether a relative speed between the following moving object V and the vehicle 100 satisfies a predetermined condition, in addition to the determination at Steps S11 to S13 in the flowchart illustrated in FIG. 6. For example, the display controller 90 may perform the processes from Step S14 if the relative speed between the following moving object V and the vehicle 100 is equal to or greater than a predetermined value. The relative speed between the following moving object V and the vehicle 100 can be calculated based on a change in the size of an image of the following moving object V in each of the frames in the first video data 110A. With this operation, the on-vehicle display system 1 can appropriately check surroundings of the vehicle 100.

When detecting the following moving object V, the recognizing unit 71 may adopt only the following moving object V that is recognized as a front face of the vehicle as a detection target, by using a recognition dictionary capable of distinguishing the front face and the rear face of the vehicle. If the rear face of the vehicle is recognized, the detected vehicle is a vehicle, such as an oncoming vehicle, that faces the opposite direction, and therefore can be eliminated from the detection target.

Further, the display controller 90 may determine as Yes at each Step when the determination condition is continuously satisfied for a certain period of time at Steps S11 to S14 and S16 in the flowchart illustrated in FIG. 6. With this operation, the on-vehicle display system 1 can prevent an unnecessary change of the video displayed on the right side monitor 150 and the left side monitor 160. In this manner, the on-vehicle display system 1 can appropriately check surroundings of the vehicle 100.

The display controller 90 may determine whether to perform the process in the flowchart illustrated in FIG. 6 based on a current location of the vehicle 100 before Step S11 in the flowchart illustrated in FIG. 6. For example, the display controller 90 may include a current location data acquiring unit that acquires a current location of the vehicle 100 and a surrounding situation data acquiring unit that acquires surrounding situations including map information, and when the vehicle 100 is running in a predetermined area, such as downtown, the display controller 90 may not perform the process in the flowchart illustrated in FIG. 6. Alternatively, the display controller 90 may include the current location data acquiring unit and the surrounding situation data acquiring unit, and when the vehicle 100 is running at a predetermined speed or higher, the display controller 90 may perform the process in the flowchart illustrated in FIG. 6.

When displaying the second right rear video data 110R2 or the second left rear video data 110L2 on the right side monitor 150 or the left side monitor 160, the display controller 90 may display the whole or a part of the data in a translucent color having a predetermined translucency. With this operation, the on-vehicle display system 1 can easily confirm that the right side monitor 150 or the left side monitor 160 displays the second right rear video data 110R2 or the second left rear video data 110L2 rather than the normal display. In this manner, the on-vehicle display system 1 can appropriately check surroundings of the vehicle 100.

The recognizing unit 81B may further determine whether a distance between the vehicle 100 and the detected close moving object is within a predetermined distance at Step SB34 in the flowchart illustrated in FIG. 24. The distance between the vehicle 100 and the detected close moving object can be obtained by identifying a ground contact position based on the contour of the detected close moving object when the recognizing unit 81B detects the close moving object on the first video data 110A, and then using a positional relationship of the ground contact position in the first video data 110A.

According to the present disclosure, it is possible to appropriately check surroundings of a vehicle.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An on-vehicle display control device comprising:
   a rear video data acquiring unit configured to acquire first video data from a rear camera that is arranged on a rear part of a vehicle and configured to image a rear view of the vehicle;
   a rear side video data acquiring unit configured to acquire second video data from rear side cameras that are arranged on right and left parts of the vehicle and configured to image rear side views of the vehicle;
   a clipping unit configured to clip a first area that is a part of the first video data acquired by the rear video data acquiring unit and second areas located on right and left sides of the first area;
   a display controller configured to display video data clipped as the first area on a rearview monitor that is configured to display rear video of the vehicle, display the second video data on side monitors that are configured to display rear side video of the vehicle, and display video data clipped as the second areas on the side monitors under a predetermined condition;
   a determining unit configured to determine a possibility that an occupant of the vehicle gets off the vehicle; and
   a selecting unit configured to select one of the second video data acquired by the rear side video data acquiring unit and video data of the second areas clipped by the clipping unit based on the possibility that the occupant of the vehicle gets off the vehicle determined by the determining unit, wherein
   the display controller is further configured to display the video data selected by the selecting unit on the side monitors that display the rear side video of the vehicle, and display the video data clipped as the first area on the rearview monitor that displays the rear video of the vehicle.

2. The on-vehicle display control device according to claim 1, wherein
   the determining unit is further configured to determine whether the vehicle is stopped and whether there is the possibility that the occupant gets off the vehicle, and
   the selecting unit is further configured to select the video data of the second areas clipped by the clipping unit when the determining unit determines that the vehicle is stopped and there is the possibility that the occupant gets off the vehicle.

3. The on-vehicle display control device according to claim 2, wherein
   the determining unit is further configured to determine that there is the possibility that the occupant gets off the vehicle when one of unlocking of a door of the vehicle, contact with an inner door handle of the vehicle, operation on the inner door handle of the vehicle, and operation to unfasten an occupant's seat belt is detected.

4. The on-vehicle display control device according to claim 1, wherein
the determining unit is further configured to separately determine the possibility that the occupant gets off the vehicle in each of a leftward direction and a rightward direction of the vehicle, and
the selecting unit is further configured to select the video data for a direction in which there is the possibility that the occupant gets off the vehicle based on the possibility that the occupant gets off the vehicle determined by the determining unit.

5. The on-vehicle display control device according to claim 1, further comprising:
a detecting unit configured to perform moving object recognition in the first video data and detect presence of a following moving object and whether the following moving object is located close to the vehicle, wherein
the display controller is further configured to cause a notifying unit to notify that the following moving object located close to the vehicle is present when the detecting unit detects the following moving object located close to the vehicle.

6. The on-vehicle display control device according to claim 1, wherein the clipping unit is further configured to clip, as the second areas, an area of the first video data corresponding to an area of the second video data acquired by the rear side video data acquiring unit and displayed in the side monitor, in which rear visibility is limited due to reflection of a body of the vehicle.

7. The on-vehicle display control device according to claim 1, wherein the clipping unit is further configured to perform the clipping such that each of the right and left sides of the first area and each of the second area partially overlap with each other.

8. The on-vehicle display control device according to claim 1, wherein the clipping unit is further configured to clip the second areas such that the second areas are located below the first area.

9. An on-vehicle display system comprising:
the on-vehicle display control device according to claim 1; and
at least one of the rear camera, the rear side camera, the rearview monitor, and the side monitor.

10. An on-vehicle display control method comprising:
acquiring rear video data as first video data from a rear camera that is arranged on a rear part of a vehicle and configured to image a rear view of the vehicle;
acquiring rear side video data as second video data from rear side cameras that are arranged on right and left parts of the vehicle and configured to image rear side views of the vehicle;
clipping a first area that is a part of the first video data acquired at the acquiring and second areas located on right and left sides of the first area;
displaying video data clipped as the first area on a rearview monitor that is configured to display rear video of the vehicle;
displaying the second video data on side monitors that are configured to display rear side video of the vehicle;
displaying video data clipped as the second areas on the side monitors under a predetermined condition;
determining a possibility that an occupant of the vehicle gets off the vehicle;
selecting one of the second video data acquired by the acquiring of the rear side video data and video data of the second areas clipped by the clipping based on the possibility that the occupant of the vehicle gets off the vehicle determined by the determining; and
further displaying the video data selected by the selecting on the side monitors that display the rear side video of the vehicle, and display the video data clipped as the first area on the rearview monitor that displays the rear video of the vehicle.

11. A non-transitory storage medium that stores a program for causing a computer to execute:
acquiring rear video data as first video data from a rear camera that is arranged on a rear part of a vehicle and configured to image a rear view of the vehicle;
acquiring rear side video data as second video data from rear side cameras that are arranged on right and left parts of the vehicle and configured to image rear side views of the vehicle;
clipping a first area that is a part of the first video data acquired at the acquiring and second areas located on right and left sides of the first area;
displaying video data clipped as the first area on a rearview monitor that is configured to display rear video of the vehicle;
displaying the second video data on side monitors that are configured to display rear side video of the vehicle;
displaying video data clipped as the second areas on the side monitors under a predetermined condition;
determining a possibility that an occupant of the vehicle gets off the vehicle;
selecting one of the second video data acquired by the acquiring of the rear side video data and video data of the second areas clipped by the clipping based on the possibility that the occupant of the vehicle gets off the vehicle determined by the determining; and
further displaying the video data selected by the selecting on the side monitors that display the rear side video of the vehicle, and display the video data clipped as the first area on the rearview monitor that displays the rear video of the vehicle.

* * * * *